(12) United States Patent
Tomasino et al.

(10) Patent No.: US 12,321,048 B2
(45) Date of Patent: Jun. 3, 2025

(54) METHOD AND SYSTEM FOR TIME-DOMAIN INTEGRATION OF BROADBAND TERAHERTZ PULSES

(71) Applicant: INSTITUT NATIONAL DE LA RECHERCHE SCIENTIFIQUE, Québec (CA)

(72) Inventors: Alessandro Tomasino, Montréal (CA); Giacomo Balistreri, Longueuil (CA); Junliang Dong, Longueuil (CA); Yoann Jestin, Montréal (CA); Aycan Yurtsever, Longueuil (CA); José Azaña, Montréal (CA); Roberto Morandotti, Montréal (CA)

(73) Assignee: INSTITUT NATIONAL DE LA RECHERCHE SCIENTIFIQUE, Québec (CA)

(*) Notice: Subject to any disclaimer, the term of this patent is extended or adjusted under 35 U.S.C. 154(b) by 945 days.

(21) Appl. No.: 17/446,801

(22) Filed: Sep. 2, 2021

(65) Prior Publication Data
US 2022/0082872 A1  Mar. 17, 2022

Related U.S. Application Data

(60) Provisional application No. 63/078,095, filed on Sep. 14, 2020.

(51) Int. Cl.
*G02F 1/01* (2006.01)
*H01P 3/10* (2006.01)

(52) U.S. Cl.
CPC ............ *G02F 1/0121* (2013.01); *H01P 3/10* (2013.01); *G02F 2203/13* (2013.01)

(58) Field of Classification Search
CPC ....... G02F 1/0121; G02F 2203/13; H01P 3/10
See application file for complete search history.

(56) References Cited

U.S. PATENT DOCUMENTS

| | | | |
|---|---|---|---|
| 9,040,919 B2* | 5/2015 | Darcie | G02B 6/102 250/353 |
| 11,588,573 B2* | 2/2023 | Dong | G02B 6/10 |
| 2003/0232612 A1 | 12/2003 | Richards et al. | |

OTHER PUBLICATIONS

M. Ferrera, Y. Park, L. Razzari, B. E. Little, S. T. Chu, R. Morandotti, D. J. Moss, and J. Azaña, "On-chip CMOS-compatible all-optical integrator," Nat. Commun. 1, 29 (2010).

(Continued)

*Primary Examiner* — Andrea Lindgren Baltzell
*Assistant Examiner* — Kimberly E Glenn
(74) *Attorney, Agent, or Firm* — Lavery, de Billy, L.L.P.; Gwendoline Bruneau

(57) ABSTRACT

A waveguide for time-domain integration of THz pulses, comprising two wires extending from an input gap $g_{in}$ to an output gap $g_{out}$ at a tapering angle $\theta$ relative to a longitudinal axis, a gap of the waveguide decreasing linearly from the input gap $g_{in}$ to the output gap $g_{out}$, wherein a size of the output gap is at least one order of magnitude smaller than a central wavelength $\lambda_{THz}$ in a spectrum of the THz pulses, and a method for time-domain integration of THz pulses, comprising confining input THz pulses in the waveguide.

20 Claims, 13 Drawing Sheets

(56) References Cited

OTHER PUBLICATIONS

J.-H. Kang, D.-S. Kim, and M. Seo, "Terahertz wave interaction with metallic nanostructures," Nanophotonics 7, 763-793 (2018).

M. A. Seo, H. R. Park, S. M. Koo, D. J. Park, J. H. Kang, O. K. Suwal, S. S. Choi, P. C. M. Planken, G. S. Park, N. K. Park, Q. H. Park, and D. S. Kim, "Terahertz field enhancement by a metallic nano slit operating beyond the skin-depth imit," Nat. Photonics 3, 152-156 (2009).

A. Tomasino, R. Piccoli, Y. Jestin, S. Delprat, M. Chaker, M. Peccianti, M. Clerici, A. Busacca, L. Razzari, and R. Morandotti, "Invited Article: Ultra-broadband terahertz coherent detection via a silicon nitride-based deep sub-wavelength metallic slit," APL Photonics 3, 110805 (2018).

H. Pahlevaninezhad, T. E. Darcie, and B. Heshmat, "Two-wire waveguide for terahertz," Opt. Express 18, 7415 (2010).

S.-H. Kim, E. S. Lee, Y. Bin Ji, and T.-I. Jeon, "Improvement of THz coupling using a tapered parallel-plate waveguide," Opt. Express 18, 1289 (2010).

H. A. Bethe, "Theory of diffraction by small holes," Phys. Rev. 66, 163-182 (1944).

K. Iwaszczuk, A. Andryieuski, A. Lavrinenko, X.-C. Zhang, and P. U. Jepsen, "Terahertz field enhancement to the MV/cm regime in a tapered parallel plate waveguide," Opt. Express 20, 8344 (2012).

Q. Wu and X. -C. Zhang, "Free-space electro-optic sampling of terahertz beams, " Appl. Phys. Lett. 67, 3523-3525 (1995).

Y. C. Shen, P. C. Upadhya, H. E. Beere, E. H. Linfield, A. G. Davies, I. S. Gregory, C. Baker, W. R. Tribe, and M. J. Evans, "Generation and detection of ultrabroadband terahertz radiation using photoconductive emitters and receivers," Appl. Phys. Lett. 85, 164-166 (2004).

N. Karpowicz, J. Dai, X. Lu, Y. Chen, M. Yamaguchi, H. Zhao, X.-C. Zhang, L. Zhang, C. Zhang, M. Price-Gallagher, C. Fletcher, O. Mamer, A. Lesimple, and K. Johnson, "Coherent heterodyne time-domain spectrometry covering the entire "terahertz gap,"" Appl. Phys. Lett. 92, 011131 (2008).

A. Nahata and T. F. Heinz, "Detection of freely propagating terahertz radiation by use of optical second-harmonic generation," Opt. Lett. 23, 67 (1998).

J. Liu, J. Dai, S. L. Chin, and X.-C. Zhang, "Broadband terahertz wave remote sensing using coherent manipulation of fluorescence from asymmetrically ionized gases," Nat. Photonics 4, 627-631 (2010).

X. Lu, N. Karpowicz, and X.-C. Zhang, "Broadband terahertz detection with selected gases," J. Opt. Soc. Am. B 26, A66 (2009).

J. Hebling, A. G. Stepanov, G. Almási, B. Bartal, and J. Kuhl, "Tunable THz pulse generation by optical rectification of ultrashort laser pulses with tilted pulse fronts," Appl. Phys. B Lasers Opt. 78, 593-599 (2004).

F. Blanchard, X. Ropagnol, H. Hafez, H. Razavipour, B. Bolduc, R. Morandotti, T. Ozaki, and D. G. Cooke, "Effect of extreme pump pulse reshaping on intense terahertz emission in lithium niobate at multimilliJoule pump energies," Opt. Lett. 39, 4333 (2014).

A. Tomasino, A. Mazhorova, M. Clerici, M. Peccianti, S.-P. Ho, Y. Jestin, A. Pasquazi, A. Markov, X. Jin, R. Piccoli, S. Delprat, M. Chaker, A. Busacca, J. Ali, L. Razzari, and R. Morandotti, "Solid-state-biased coherent detection of ultra-broadband terahertz pulses," Optica 4, 1358 (2017).

J.-C. Diels and W. Rudolph, Ultrashort Laser Pulse Phenomena☐: Fundamentals, Techniques, and Applications on a Femtosecond Time Scale (Elsevier/Academic Press, 2006).

F. M. Dekking, C. Kraaikamp, H. P. Lopuhaä, and L. E. Meester, A Modern Introduction to Probability and Statistics, Springer Texts in Statistics (Springer London, 2005).

P. Klarskov, A. C. Strikwerda, K. Iwaszczuk, and P. U. Jepsen, "Experimental three-dimensional beam profiling and modeling of a terahertz beam generated from a two-color air plasma," New J. Phys. 15, 75012 (2013).

F. Buccheri, P. Huang, X.-C. Zhang, F. Buccheri, P. Huang, and X.-C. Zhang, "Generation and detection of pulsed terahertz waves in gas: from elongated plasmas to microplasmas," Front. Optoelectron. 11, 209-244 (2018).

R. Slavík, Y. Park, N. Ayotte, S. Doucet, T.-J. Ahn, S. LaRochelle, and J. Azaña, "Photonic temporal integrator for all-optical computing," Opt. Express 16, 18202 (2008).

R. Ashrafi and J. Azaña, "Terahertz bandwidth all-optical Hilbert transformers based on long-period gratings," Opt. Lett. 37, 2604 (2012).

J. Ma, R. Shrestha, L. Moeller, and D. M. Mittleman, "Invited Article: Channel performance for indoor and outdoor terahertz wireless links," APL Photonics 3, 051601 (2018).

W. Saad, M. Bennis, and M. Chen, "A Vision of 6G Wireless Systems: Applications, Trends, Technologies, and Open Research Problems," IEEE Netw. pp. 1-9 (2019).

A. G. Barnston, "Correspondence among the correlation, RMSE, and Meidke Foresast verification measures; Refinement of the Neidke Score," Weather Forecast. 7, 699-709 (1992).

S. A. Glantz and B. K. Slinker, Primer of Applied Regression & Analysis of Variance (McGraw-Hill, Medical Pub. Division, 2001).

M. Tonouchi, "Cutting-edge terahertz technology," Nat. Photonics 1, 97-105 (2007).

B. Ferguson and X.-C. Zhang, "Materials for terahertz science and technology," Nat. Mater. 1, 26-33 (2002).

N. Horiuchi, "Terahertz technology: Endless applications," Nat. Photonics 4, 140-140 (2010).

H. W. Hubers, "Terahertz technology: Towards THz integrated photonics," Nat. Photonics 4, 503-504 (2010).

Y.-S. Lee, Principles of Terahertz Science and Technology (Springer, 2009).

A. Tomasino, A. Parisi, S. Stivala, P. Livreri, A. C. Cino, A. C. Busacca, M. Peccianti, and R. Morandotti, "Wideband THz Time Domain Spectroscopy based on Optical Rectification and Electro-Optic Sampling," Sci. Rep. 3, 3116 (2013).

D. M. Mittleman, R. H. Jacobsen, R. Neelamani, R. G. Baraniuk, and M. C. Nuss, "Gas sensing using terahertz time-domain spectroscopy," Appl. Phys. B Lasers Opt. 67, 379-390 (1998).

C. Zandonella, "T-ray specs," Nature 424, 721-722 (2003).

H. Breitenborn, J. Dong, R. Piccoli, A. Bruhacs, L. V. Besteiro, A. Skripka, Z. M. Wang, A. O. Govorov, L. Razzari, F. Vetrone, R. Naccache, and R. Morandotti, "Quantifying the photothermal conversion efficiency of plasmonic nanoparticles by means of terahertz radiation," APL Photonics 4, 126106 (2019).

J. Dong, H. Breitenborn, R. Piccoli, L. V Besteiro, P. You, D. Caraffini, Z. M. Wang, A. O. Govorov, R. Naccache, F. Vetrone, L. Razzari, and R. Morandotti, "Terahertz three-dimensional monitoring of nanoparticle-assisted laser tissue soldering," Biomed. Opt. Express 11, 2254 (2020).

W. Withayachumnankul and D. Abbott, "Terahertz imaging: Compressing onto a single pixel," Nat. Photonics 8, 593-594 (2014).

D. M. Mittleman, "Twenty years of terahertz imaging [Invited]," Opt. Express 26, 9417 (2018).

F. Rutz, M. Koch, S. Khare, M. Moneke, H. Richter, and U. Ewert, "Terahertz quality control of polymeric products," Int. J. Infrared Millimeter Waves 27, 547-556 (2006).

K. Lien Nguyen, T. Friščić, G. M. Day, L. F. Gladden, and W. Jones, "Terahertz time-domain spectroscopy and the quantitative monitoring of mechanochemical cocrystal formation," Nat. Mater. 6, 206-209 (2007).

T. Nagatsuma, G. Ducournau, and C. C. Renaud, "Advances in terahertz communications accelerated by photonics," Nat. Photonics 10, 371-379 (2016).

S. Ummethala, T. Harter, K. Koehnle, Z. Li, S. Muehlbrandt, Y. Kutuvantavida, J. Kemal, P. Marin-Palomo, J. Schaefer, A. Tessmann, S. K. Garlapati, A. Bacher, L. Hahn, M. Walther, T. Zwick, S. Randel, W. Freude, and C. Koos, "THz-to-optical conversion in wireless communications using an ultra-broadband plasmonic modulator," Nat. Photonics 13, 519-524 (2019).

H. J. Song and T. Nagatsuma, "Present and future of terahertz communications," IEEE Trans. Terahertz Sci. Technol. 1, 256-263 (2011).

(56) References Cited

OTHER PUBLICATIONS

A. J. Seeds, H. Shams, M. J. Fice, and C. C. Renaud, "TeraHertz Photonics for Wireless Communications," J. Light. Technol. 33, 579-587 (2015).
J. Federici and L. Moeller, "Review of terahertz and subterahertz wireless communications," J. Appl. Phys. 107, (2010).
S. F. Busch, S. Schumann, C. Jansen, M. Scheller, M. Koch, and B. M. Fischer, "Optically gated tunable terahertz filters," Appl. Phys. Lett. 100, 261109 (2012).
R. Mendis, A. Nag, F. Chen, and D. M. Mittleman, "A tunable universal terahertz filter using artificial dielectrics based on parallel-plate waveguides," Appl. Phys. Lett. 97, 131106 (2010).
M. K. Mridha, A. Mazhorova, M. Clerici, I. Al-Naib, M. Daneau, X. Ropagnol, M. Peccianti, C. Reimer, M. Ferrera, L. Razzari, F. Vidal, and R. Morandotti, "Active terahertz two-wire waveguides," Opt. Express 22, 22340 (2014).
M. Daniel, "Device physics: A terahertz modulator," Nature 444, 560-561 (2006).
N. Karl, K. Reichel, H. T. Chen, A. J. Taylor, I. Brener, A. Benz, J. L. Reno, R. Mendis, and D. M. Mittleman, "An electrically driven terahertz metamaterial diffractive modulator with more than 20 dB of dynamic range," Appl. Phys. Lett. 104, 091115 (2014).
K. S. Reichel, N. Lozada-Smith, I. D. Joshipura, J. Ma, R. Shrestha, R. Mendis, M. D. Dickey, and D. M. Mittleman, "Electrically reconfigurable terahertz signal processing devices using liquid metal components," Nat. Commun. 9, 1-6 (2018).
T. Yasui, H. Takahashi, K. Kawamoto, Y. Iwamoto, K. Arai, T. Araki, H. Inaba, and K. Minoshima, "Widely and continuously tunable terahertz synthesizer traceable to a microwave frequency standard," Opt. Express 19, 4428 (2011).
M. Katoh and S. Bielawski, "Coherent terahertz synthesizer," Nat. Photonics 6, 76-77 (2012).
A. Rice, Y. Jin, X. F. Ma, X. C. Zhang, D. Bliss, J. Larkin, and M. Alexander, "Terahertz optical rectification from <110> zinc-blende crystals," Appl. Phys. Lett. 64, 1324-1326 (1994).
M. Tani, S. Matsuura, K. Sakai, and S. Nakashima, "Emission characteristics of photoconductive antennas based on low-temperature-grown GaAs and semi-insulating GaAs," Appl. Opt. 36, 7853 (1997).
D. J. Cook and R. M. Hochstrasser, "Intense terahertz pulses by four-wave rectification in air," Opt. Lett. 25, 1210 (2000).
M. Clerici, M. Peccianti, B. E. Schmidt, L. Caspani, M. Shalaby, M. Giguère, A. Lotti, A. Couairon, F. Légaré, T. Ozaki, D. Faccio, and R. Morandotti, "Wavelength Scaling of Terahertz Generation by Gas Ionization," Phys. Rev. Lett. 110, 253901 (2013).
N. K. Berger, B. Levit, B. Fischer, M. Kulishov, D. V. Plant, and J. Azaña, "Temporal differentiation of optical signals using a phase-shifted fiber Bragg grating," Opt. Express 15, 371 (2007).

M. Kulishov and J. Azaña, "Design of high-order all-optical temporal differentiators based on multiple-phase-shifted fiber Bragg gratings," Opt. Express 15, 6152 (2007).
C. Cuadrado-Laborde and M. V. Andrés, "In-fiber all-optical fractional differentiator," Opt. Lett. 34, 833 (2009).
M. A. Preciado and M. A. Muriel, "Ultrafast all-optical integrator based on a fiber Bragg grating: proposal and design," Opt. Lett. 33, 1348 (2008).
A. Filin, M. Stowe, and R. Kersting, "Time-domain differentiation of terahertz pulses," Opt. Lett. 26, 2008 (2001).
M. Walther, M. R. Freeman, and F. A. Hegmann, "Metal-wire terahertz time-domain spectroscopy," Appl. Phys. Lett. 87, 1-3 (2005).
M. M. Awad and R. A. Cheville, "Transmission terahertz waveguide-based imaging below the diffraction limit," Appl. Phys. Lett. 86, 1-3 (2005).
Y. Matsuura and E. Takeda, "Hollow optical fibers loaded with an inner dielectric film for terahertz broadband spectroscopy," J. Opt. Soc. Am. B 25, 1949 (2008).
R. Mendis and D. Grischkowsky, "Undistorted guided-wave propagation of subpicosecond terahertz pulses," Opt. Lett. 26, 846 (2001).
K. Iwaszczuk, A. Andryieuski, A. Lavrinenko, X.-C. Zhang, and P. U. Jepsen, "Non-invasive terahertz field imaging inside parallel plate waveguides," Appl. Phys. Lett. 99, 071113 (2011).
T. Ma, K. Nallapan, H. Guerboukha, and M. Skorobogatiy, "Analog signal processing in the terahertz communication links using waveguide Bragg gratings: example of dispersion compensation," Opt. Express 25, 11009 (2017).
M. Mbonye, R. Mendis, and D. M. Mittleman, "A terahertz two-wire waveguide with low bending loss," Appl. Phys. Lett. 95, 233506 (2009).
R. E. Collin, Foundations for Microwave Engineering (IEEE Press, 2001).
S. Ramo, J. R. Whinnery, and T. Van Duzer, Fields and Waves in Communication Electronics (Wiley, 1994).
G. Yan, A. Markov, Y. Chinifooroshan, S. M. Tripathi, W. J. Bock, and M. Skorobogatiy, "Low-loss terahertz waveguide Bragg grating using a two-wire waveguide and a paper grating," Opt. Lett. 38, 3089 (2013).
E. S. Lee and T.-I. Jeon, "Tunable THz notch filter with a single groove inside parallel-plate waveguides," Opt. Express 20, 29605 (2012).
E. S. Lee, S.-G. Lee, C.-S. Kee, and T.-I. Jeon, "Terahertz notch and low-pass filters based on band gaps properties by using metal slits in tapered parallel-plate waveguides," Opt. Express 19, 14852 (2011).
M. A. Bhagyaveni, R. Kalidoss, and K. S. Vishvaksenan, Introduction to Analog and Digital Communication (Wiley, 2016).
J. Azaña, "Ultrafast analog all-optical signal processors based on fiber-grating devices," IEEE Photonics J. 2, 359-386 (2010).

\* cited by examiner

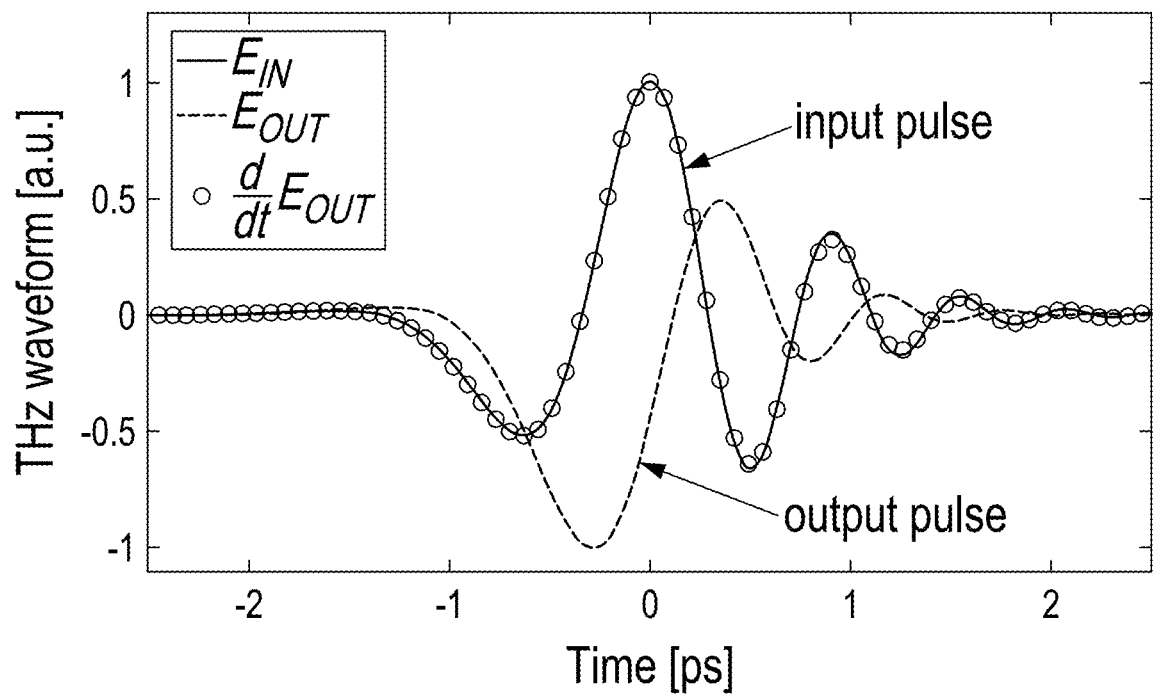
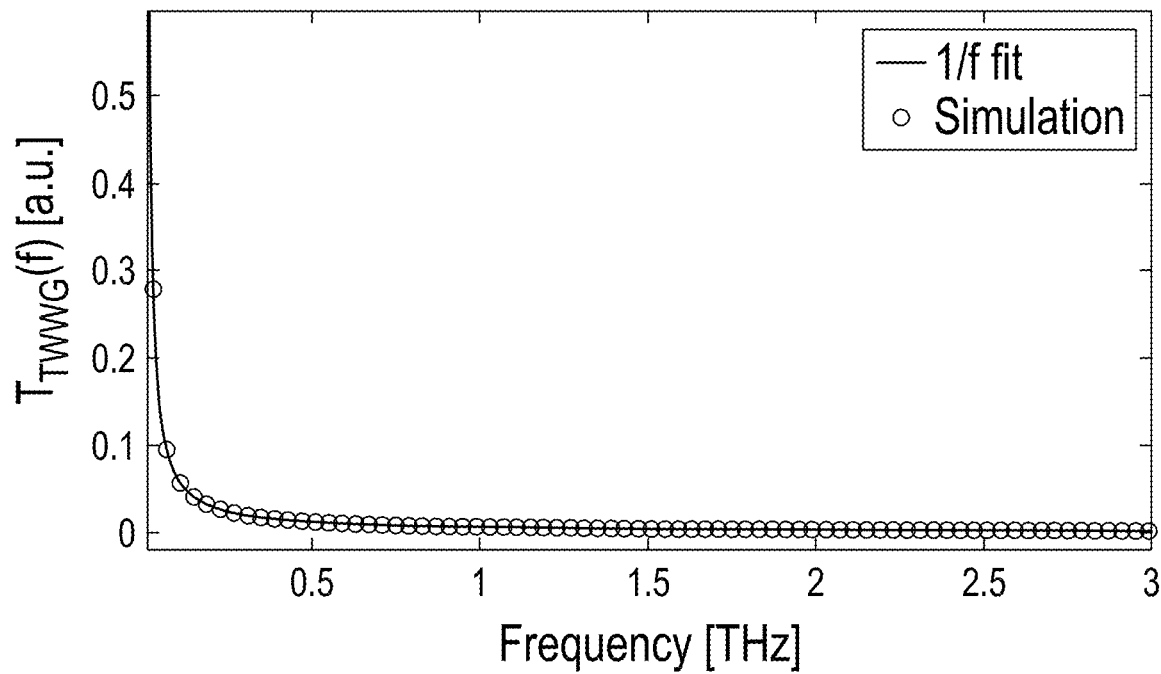

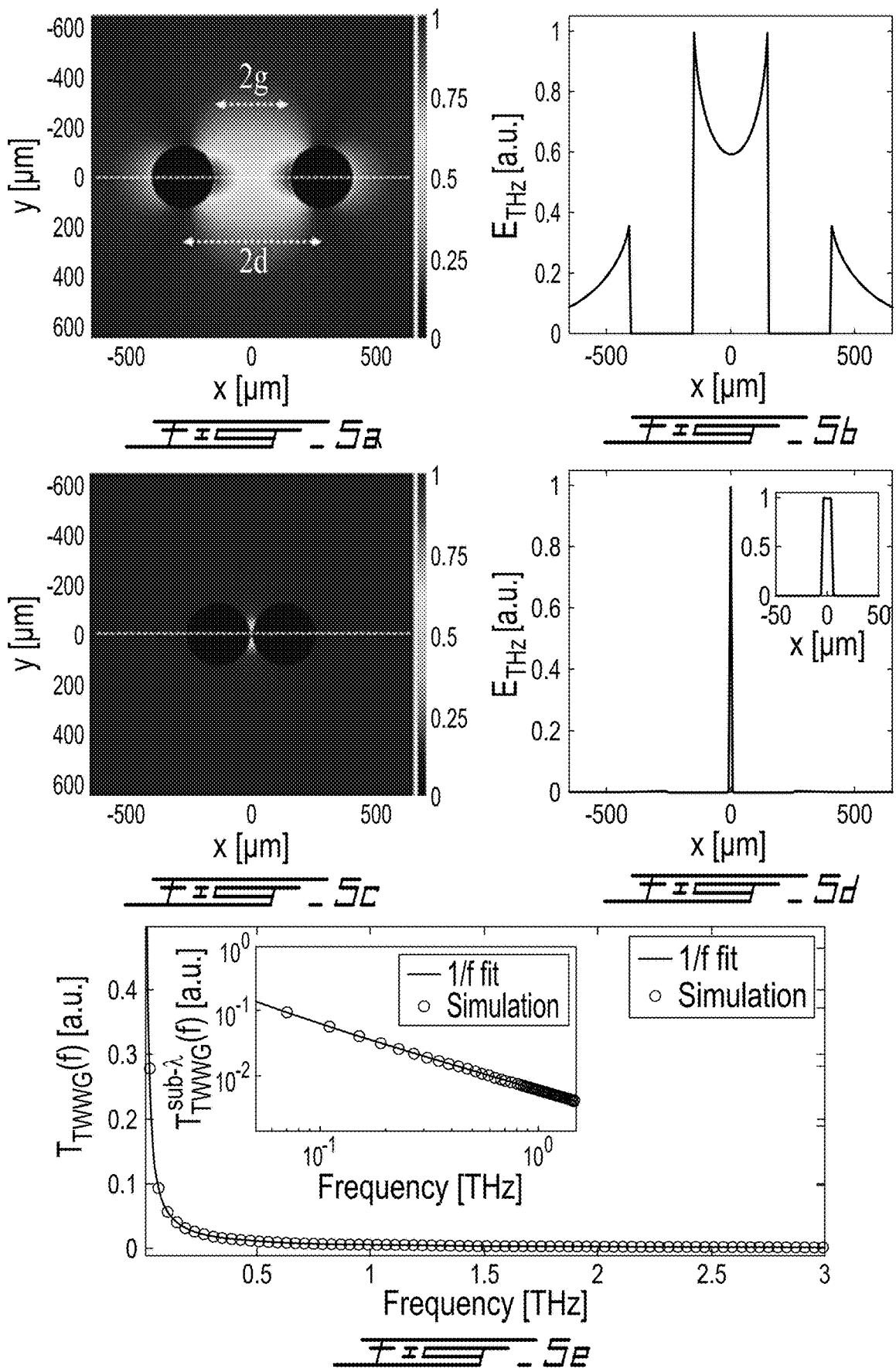

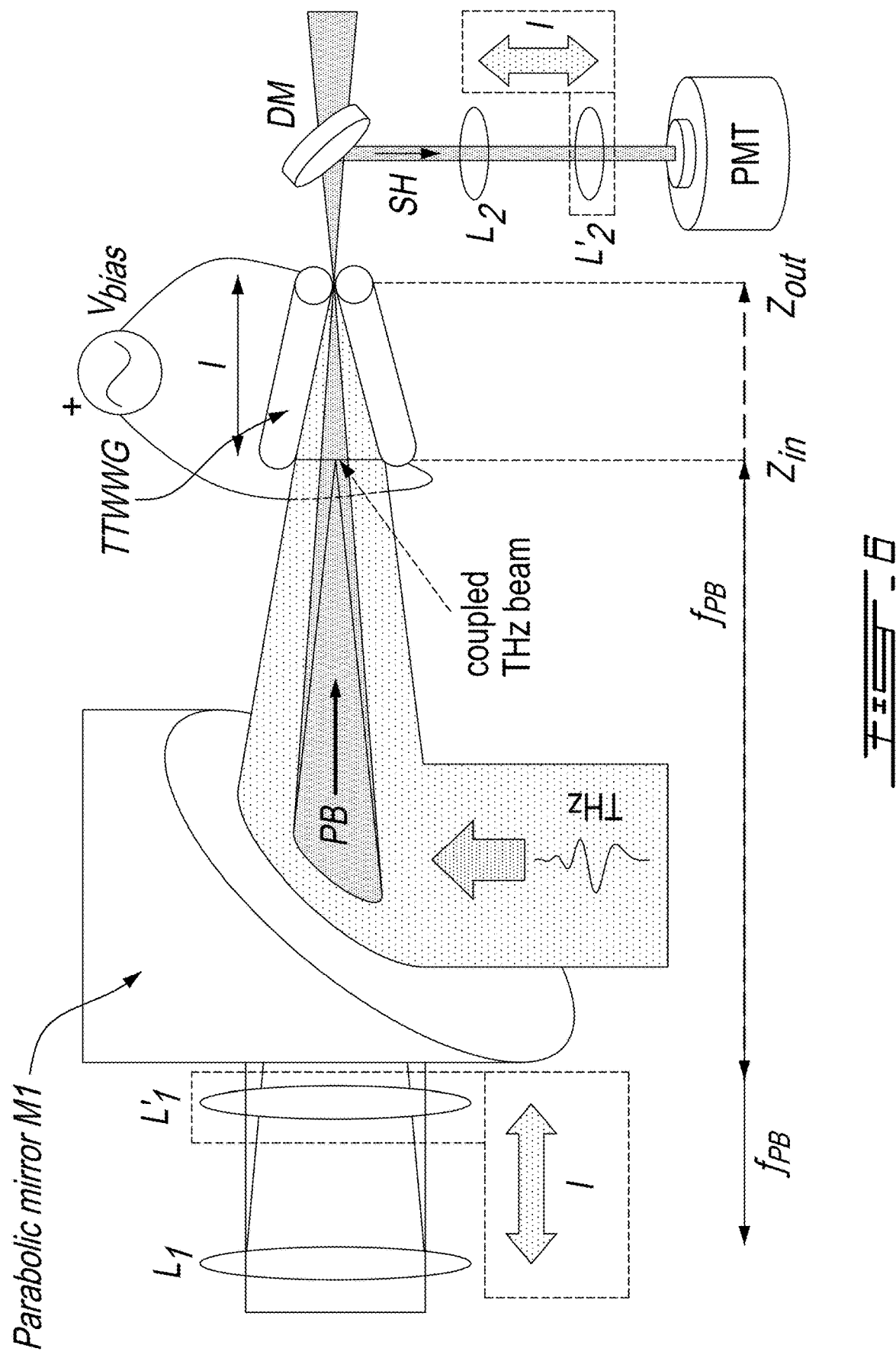

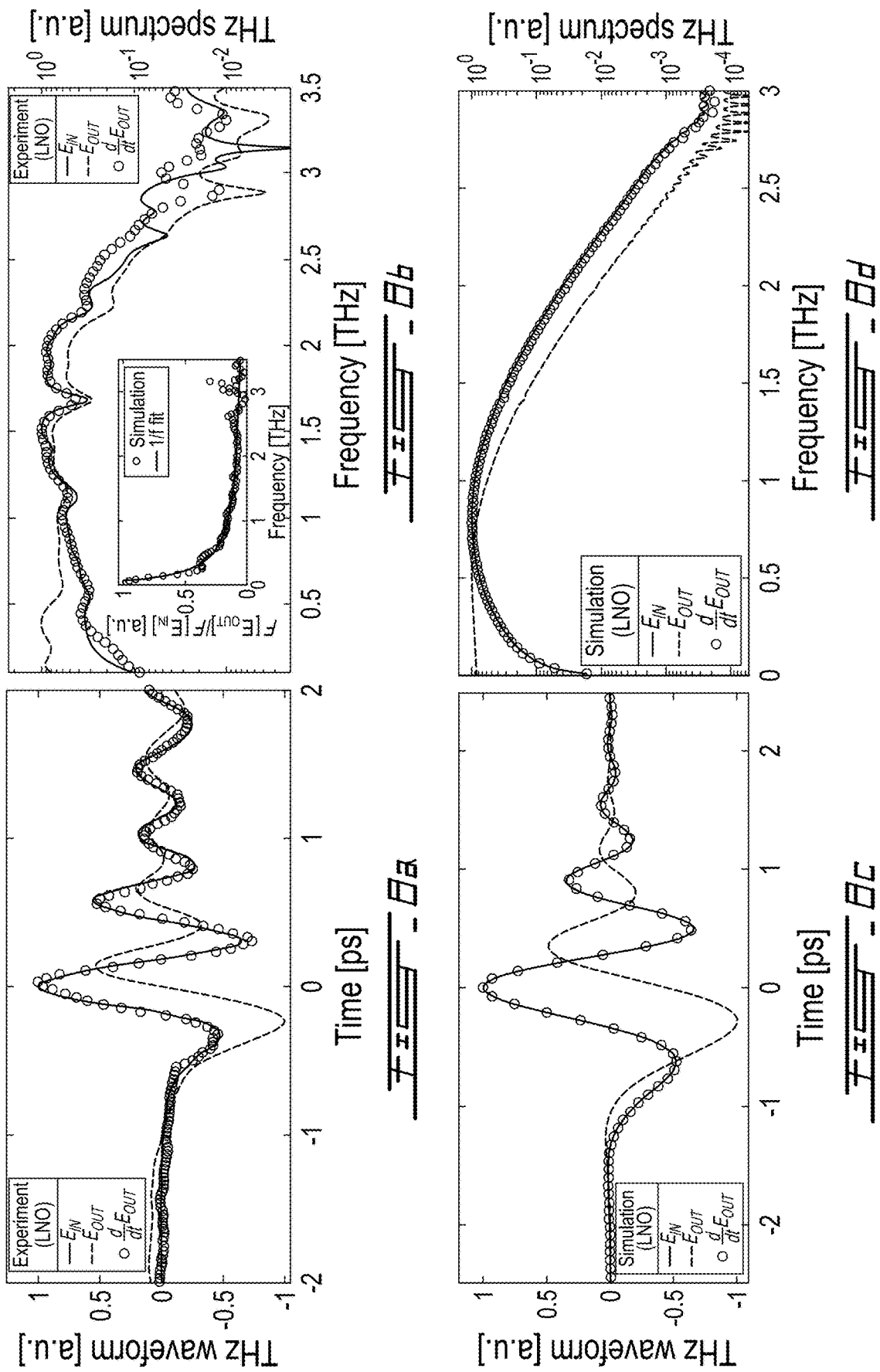

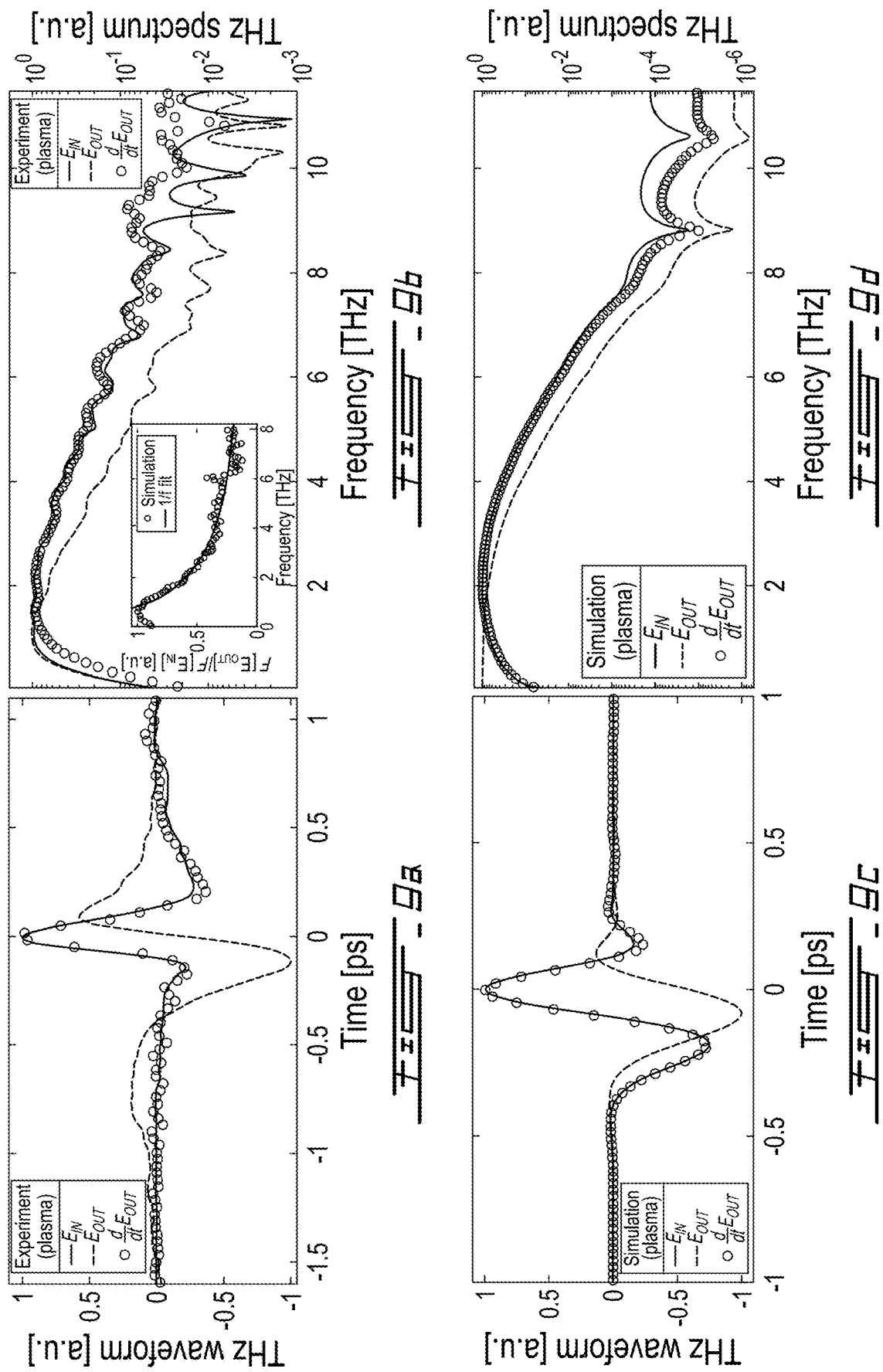

METHOD AND SYSTEM FOR TIME-DOMAIN INTEGRATION OF BROADBAND TERAHERTZ PULSES

CROSS REFERENCE TO RELATED APPLICATIONS

This application claims benefit, under 35 U.S.C. § 119(e), of U.S. provisional application Ser. No. 63/078,095, filed on Sep. 14, 2020. All documents above are incorporated herein in their entirety by reference.

FIELD OF THE INVENTION

The present invention relates to terahertz signal processing. More specifically, the present invention is concerned with a method and system for time-domain integration of broadband terahertz pulses.

BACKGROUND OF THE INVENTION

The time integration of terahertz (THz) pulses represents a key technological step towards the development of a number of methods for analog signal-processing temporal THz waveforms without previously converting the corresponding THz electric-field transients into data bit streams. In particular, for next 6G generation of telecommunication, time-domain integration of THz pulses will be required in order to pre-condition the received THz signals and restore the original information encoded at the transmission module, according to an emphasis/de-emphasis communication protocol. Methods and systems for analog time-domain integration of THz pulses will allow boosting the performances of THz communication links in terms of signal-to-noise ratio and transferring throughput. Time-domain integration of THz pulses is also of great interest in the implementation of detection circuits capable of performing band conversion of frequency/phase-modulated THz signals and solving differential Relations.

Currently, the only available method for the time-domain integration of a THz pulse is the digital acquisition of the corresponding waveform and followed by the calculation of its integral function by means of standard numerical algorithms. Besides such a digital approach, neither theoretical nor practical demonstration of an analog broadband THz time-domain integrator has been presented so far.

In order to carry out the digital time integration of a THz pulse, data acquisition is performed in the first place via a suitable THz detection method, so to collect of a sufficiently large set of temporal data points according to the Nyquist's theorem, so not to cause temporal aliasing. However, the digital method is a feasible solution only when the THz pulse has already reached the final detection system, where it is ultimately recorded. Indeed, the freely propagating THz waveform is altered or even destroyed during detection while the information carried by the propagating THz pulse is transferred to another frequency domain (for example encoded into an optical beam). Consequently, the digitally time-integrated THz pulse cannot be either re-generated or manipulated in intermediate stages, as it is needed in order to implement analog signal-processing applications.

There is still a need in the art for a system and a method for the analog time-domain integration of broadband THz pulses.

The present description refers to a number of documents, the content of which is herein incorporated by reference in their entirety.

SUMMARY OF THE INVENTION

More specifically, in accordance with the present invention, there is provided a waveguide for time-domain integration of THz pulses, comprising two wires extending from an input gap $g_{in}$ to an output gap $g_{out}$ at a tapering angle $\theta$ relative to a longitudinal axis, a gap of the waveguide decreasing linearly from the input gap $g_{in}$ to the output gap $g_{out}$, wherein a size of the output gap is at least one order of magnitude smaller than a central wavelength $\lambda_{THz}$ in a spectrum of the THz pulses.

There is further provided a method for time-domain integration of THz pulses, comprising confining input THz pulses in a waveguide comprising two wires separated by a gap linearly decreasing between an input gap and an output gap, wherein a size of the output gap is at least one order of magnitude smaller than a central wavelength $\lambda_{THz}$ in a spectrum of the input THz pulses.

There is further provided a system for time-domain integration of THz pulses, comprising a waveguide made of two wires separated by a gap linearly decreasing between an input gap and an output gap, wherein a size of the output gap is at most one order of magnitude smaller than a central wavelength $\lambda_{THz}$ in a spectrum of the THz pulses.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 3 shows THz electric field waveforms as simulated at the input and output ends of the waveguide of FIG. 2; the dotted line representing the numerically evaluated time derivative of the output waveform;

FIG. 4 shows the spectral response of the waveguide of FIG. 2 calculated in a 3-THz-bandwidth (dots) by taking the ratio between the output and input THz electric field spectra, the solid line representing a 1/f fitting curve corresponding to the ideal spectral response of a time integrator;

FIG. 5A is a 2D colormap of the THz electric field distribution of the propagating transverse electromagnetic mode (TEM) mode calculated on the line hosting the wire centers (white dashed line), for a waveguide of a gap 2g of 300 µm according to an embodiment of the present disclosure, FIG. 5B maps the transverse profile of the propagating TEM mode of FIG. 5A;

FIG. 5C is a 2D colormap of the THz electric field distribution of the propagating TEM mode calculated on the line hosting the wire centers (white dashed line), for the case of a waveguide of a gap 2g of 10 µm according to an embodiment of the present disclosure;

FIG. 5D shows the transverse profile of the propagating TEM mode of FIG. 5C; the inset showing a zoom of the electric field profile in the sub-λ gap;

FIG. 5E shows the spectral response of a sub-λ waveguide of same gap as in FIG. 3C and FIG. 3D (open circle) and a 1/f fit curve (solid line), the inset showing the frequency range below 1.1 THz;

FIG. 6 is a schematical view of a detection system employed to record the THz waveforms according to an embodiment of the present disclosure;

FIG. 8A shows experimental temporal curves retrieved by employing an LNO THz source, the solid line, stippled line and open circles indicate the input signal, the output signal and its numerical first time derivative, respectively;

FIG. 8B shows experimental spectral curves retrieved by employing an LNO THz source, the solid line, stippled line and open circles indicate the input signal, the output signal and its numerical first time derivative, respectively; F stands for the Fourier transformation of the temporal waveform, the inset showing the experimental spectral response of the TTWWG (open circles) fitted with a 1/f curve (solid line);

FIG. 8C shows simulated temporal curves retrieved by employing an LNO THz source, the solid line, stippled line and open circles indicate the input signal, the output signal and its numerical first time derivative, respectively;

FIG. 8D shows simulated spectral curves retrieved by employing an LNO THz source, the solid line, stippled line and open circles indicate the input signal, the output signal and its numerical first time derivative, respectively, F stands for the Fourier transformation of the temporal waveform;

FIG. 9A shows experimental temporal curves retrieved by employing a two-color plasma THz source, the stippled line, black open circles indicating the input signal, the output signal and its numerical first time derivative, respectively;

FIG. 9B shows experimental spectral curves retrieved by employing a two-color plasma THz source, F stands for the Fourier transformation of the temporal waveform, the inset showing the experimental spectral response of the TTWWG (open circles) fitted with a 1/f curve (solid line);

FIG. 9C shows simulated temporal curves retrieved by employing a two-color plasma THz source;

FIG. 9D shows simulated spectral curves retrieved by employing a two-color plasma THz source, F stands for the Fourier transformation of the temporal waveform;

DESCRIPTION OF ILLUSTRATIVE EMBODIMENTS

The present invention is illustrated in further details by the following non-limiting examples.

Figure 1:
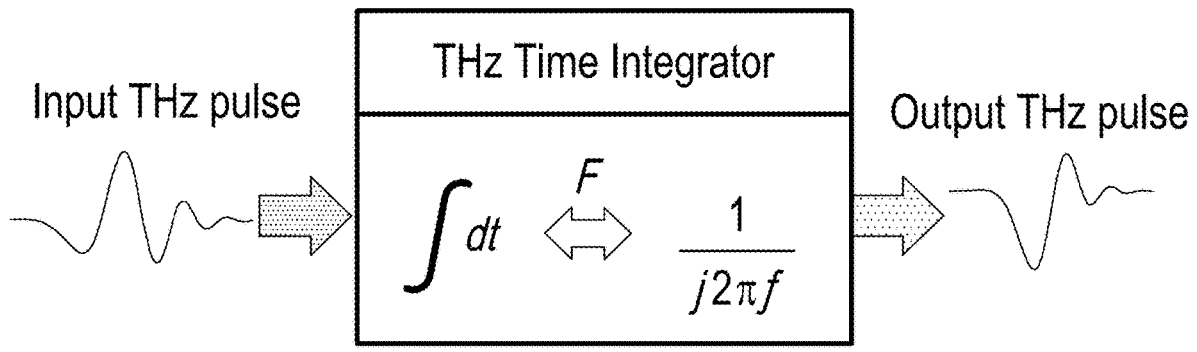
FIG. 1 is a block diagram of a time domain integrator for broadband signals at THz frequencies.

The output signal $E_{out}$ of a time domain integrator schematically illustrated FIG. 1 as schematically illustrated FIG. 1 from an input time-varying THz pulse $E_{in}$ of frequency f results from a first-order integral operation expressed in the time and frequency domains as follows:

$$E_{out}(t) = \int E_{in}(t)dt \underset{F}{\Leftrightarrow} \overline{E}_{out}(f) = \frac{1}{j2\pi f}\overline{E}_{in}(f) \qquad (1)$$
$$\text{TIME} \qquad\qquad \text{FREQUENCY}$$

The Fourier Transform operator F links the time t domain on the left hand side and the frequency domain on the right hand side. The bars over the frequency-dependent terms on the right hand side indicate the complex spectra of the corresponding temporal electric fields on the left hand side. $1/j2\pi f$ a purely imaginary term $1/j2\pi f$. As shown in Relation (1) above, the non-resonant frequency response of the THz integrator enhances the low frequency components of the input THz pulse.

Figure 2:
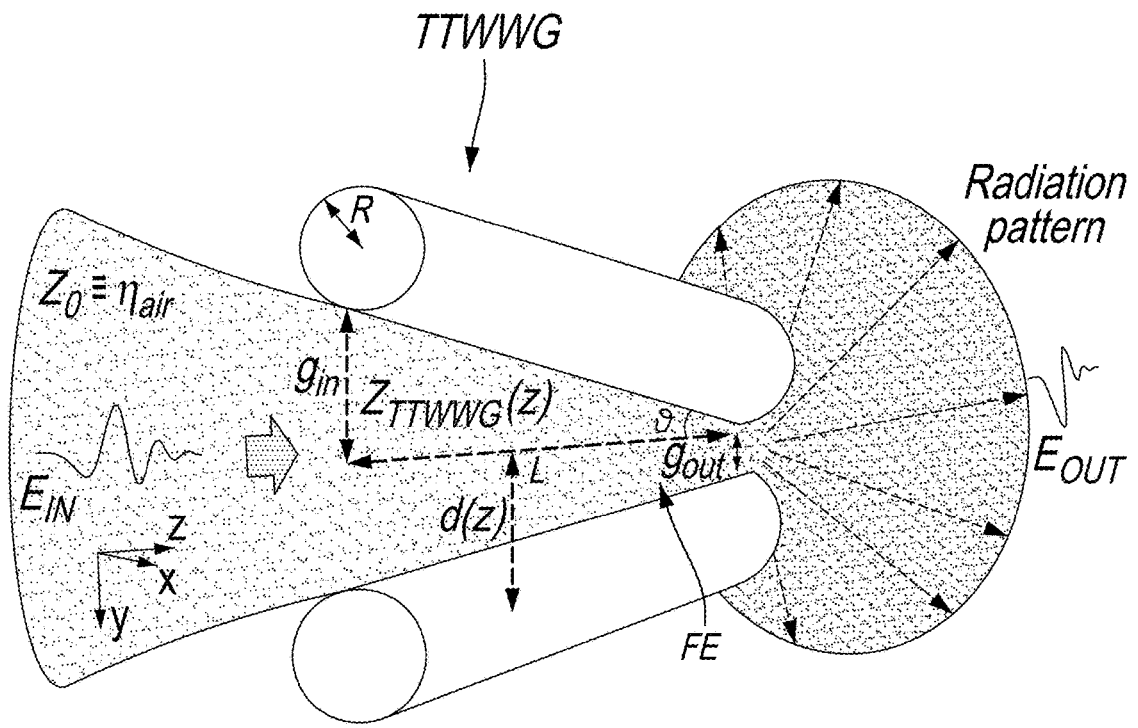
FIG. 2 is a schematical view of a two-wire waveguide according to an embodiment of an aspect of the present disclosure.

A waveguide according to an embodiment of an aspect of the present disclosure comprises two wires W of radius R separated by a linearly decreasing gap between the input end of the waveguide and the output end of the waveguide over the length L of the waveguide between. As seen in FIG. 2 for example, the wires extend into a V-shaped unit, each wire running at a tapering angle θ relative to the longitudinal axis of the waveguide, and form a tapered two-wire waveguide TTWWG of input gap $g_{in}$ and output gap $g_{out}$.

The wires are made of metallic materials, such as copper, gold or aluminum for example. They are supported in tension using wire holders made of a polymer material such as Teflon™, polyimide, Plexiglas for example. The wire radius (R) is at least equal to the central wavelength ($\lambda_{THz}$)

in the spectrum of the THz pulse to be time-integrated, for example in a range between about 50 and about 500 micrometers.

The size of the output gap $g_{out}$ is selected so as to be much smaller, for example at least one order of magnitude smaller, than the central wavelength of the input THz pulses depending on the input THz pulses spectrum; for example, for a central wavelength of the input THz pulse $\lambda_{THz}=300$ microns, an output gap $g_{out}$ of at most 30 microns is selected, depending on the input THz pulse spectrum. Some THz pulses extend from 3000 to 300 microns in wavelengths, other pulses may range from 3000 down to 10 microns. The input gap, opposed to the output gap, is of the same order of magnitude than the input THz pulse wavelength $\lambda_{THz}$, and selected depending on the input pulses. For example, the input gap may be selected in a range between 0.1 and 3 mm.

The tapering angle or the gap variation over a $\lambda_{THz}$-long propagation are selected depending on the central wavelength of the input THz pulse $\lambda_{THz}$. The tapering angle θ is selected in a range between 0°, for a straight waveguide with a sub-wavelength gap, and a maximum tapering angle θmax. The maximum tapering angle θmax is selected so that none of the frequencies are radiated out of the waveguide and then lost, in such a way to maintain the original temporal shape of the input THz wave, without alteration of its frequency content by gap-discontinuities larger than $G_{THz}=\Delta_{THz}/10$ over a propagation distances as long as $\lambda_{THz}$, i.e. before the THz wave reaches the output end of the waveguide. Considering a central THz wavelength $\lambda_{THz}$, the maximum tapering angle θmax is about 3° for a maximum gap variation $G_{THz}=\lambda_{THz}/10$, as determined as follows: θ_max=tan^(−1) [(½*(λ/10))/λ)]=tan^(−1) [1/20]≈2.86°.

The input THz pulse $E_{in}$ injected into the TTWWG at the input gap $g_{in}$ and propagating towards the sub-wavelength output gap $g_{out}$ is enhanced by a factor equal to FE, which is a function of the THz frequency, thereby reshaped into the waveform of the output THz pulse $E_{out}$.

As the THz pulse propagates from the input end to the output end, the THz energy is squeezed within the waveguide into the decreasing volume of the tapered waveguide. The THz electric field associated to the broadband THz pulse forces the electron clouds on both the wire surfaces to drift towards the center line of the waveguide, within the gap where the surface of each wire face each other and which decreases in size as the THz pulse propagates towards the waveguide output. Such accumulation of the THz electric field in the decreased volume induces an enhancement of the THz electric field, which is characterized by a specific dependency on THz frequency.

Indeed, each frequency component $f_{THz}$ of the THz pulse is able to drive an electron cloud of a size comparable with the corresponding wavelength $\lambda_{THz} \propto 1/f_{THz}$. Since, the THz electric field enhancement FE is proportional to the electron cloud size, the longer the wavelength, the higher the electric field enhancement (FE) induced by the waveguide $FE_{TTWWG}(f_{THz})$:

$$FE_{TTWWG}(f_{THz}) \propto \frac{1}{f_{THz}} \qquad (2)$$

As shown in relation (2), the electric field enhancement $FE_{TTWWG}(f_{THz})$ of the TTWWG is higher for the lower frequencies, thus resulting in a reshaping of the THz pulse waveform in the time domain.

The propagation of a broadband THz pulse of central frequency of $f_{THz}=1$ THz ($\lambda_{THz}=300$ μm) and bandwidth of $B_w=3$ THz, through a TTWWG with $g_{in}=550$ μm, $g_{out}=5$ μm, L=3.5 cm and R=127 μm was simulated using Finite-Difference Time-Domain method. The input gap $g_{in}$ was selected in such a way that the THz spot area focused onto the waveguide input was largely overlapped with the entrance aperture of the waveguide. Thus, the THz beam was considered focused to a spot area of waist $w_{THz}=600$ μm, which fulfills the condition $g_{in} \sim w_{THz}$. Specifically, the time-varying THz electric fields were calculated at the waveguide input ($E_{in}$) and output ($E_{out}$) ends, as well as the corresponding spectra, evaluated via Fast Fourier Transformation (FFT).

The time-domain integration performed by the tapered two-wire waveguide (TTWWG) was confirmed by performing the first-order differentiation of the output THz waveform. Indeed, assuming that the waveguide performs the correct time-domain integration, then the shape of the numerically-evaluated time derivative of the output field, i.e. $dE_{out}/dt$, should accurately reproduce the input field $E_{in}$. As may be seen from the comparison between the input and output waveforms, along with the first-order derivative of the output field in FIG. 3 and the agreement between $E_{in}$ and $dE_{out}/dt$ curves, the time integration of the input THz pulse is effectively achieved at the waveguide output.

For further confirmation, the spectral response $T_{TTWWG}(f_{THz})$ of the waveguide was evaluated as follows:

$$T_{TTWWG}(f_{THz}) = \frac{E_{out}(f_{THz})}{E_{in}(f_{THz})} \qquad (3)$$

FIG. 4 shows the waveguide spectral response obtained using relation (3) and simulation data. The trend can be fitted with a 1/f curve, characteristic of the spectral response of an ideal time-domain integrator, thus confirming that the waveguide spectrally behaves as a THz time-domain integrator.

Time-domain integration of broadband terahertz pulses is thus shown, by due geometrical confinement of the THz radiation in the sub-wavelength gap in the waveguide formed by the two metallic wires separated by the variable air gap, which decreases down to a sub-wavelength size from the waveguide input to the waveguide output. While propagating towards the sub-wavelength output gap, the input THz pulse is reshaped into its first-order time integral waveform.

In order to prove the time integration functionality of the tapered two-wire waveguide, a near field-resolved detection method was implemented to reconstruct the THz waveform while propagating along the waveguide, so to prevent out-coupling diffraction from altering the shape of the time-integrated THz transient. Since the time-domain integration is due to the geometrical confinement of the THz radiation in a sub-wavelength gap volume, the operational spectral range can be tuned by selecting the output gap size and the waveguide tapering angle θ. The obtained analog THz time integrator is capable of processing THz waveforms of spectra in the range between about 0 and about 10 THz, directly in the THz frequency domain.

Theoretical Aspects

In the frequency domain, an ideal system performing the first-order time integration of an input signal $E_{IN}(f)$ provides an output signal $E_{OUT}(f)$, as follows:

$$H(f) = \frac{E_{OUT}(f)}{E_{IN}(f)} \propto \frac{1}{j2\pi f} \quad (4)$$

The ideal transfer function of a first-order integrator H(f) is a purely imaginary transmission function, the magnitude of which shows a hyperbolic dependence upon the frequency. As the hyperbolic function more effectively emphasizes the low-frequency components, the integration action enhances the lower part of the spectrum.

In order to derive the spectral response of a two wire waveguide TWWG of constant sub-$\lambda$ gap, modal simulations aiming at retrieving the fundamental mode sustained by this type of TWWG geometry were carried out.

In particular, FIGS. 5A and 5B show the electric field distribution of the TEM eigenmode and its transverse profile on the plane containing the wire centers, respectively, calculated for the case of two identical copper wires with a radius of R=127 µm and separated by an air gap 2g=300 µm, at a frequency of $f_c$=1 THz. The results show that the THz electric field exhibits two identical maxima very close to the wire surface facing the gap, yet featuring two external evanescent tails. However, as the gap shrinks down to 10 µm only, for fixed R and $f_c$, the field distribution changes, causing the merging of the two maxima and the formation of a plateau over the entire gap, as shown in FIGS. 5C and 5D. Such a field profile, along with the dramatic decrease of the evanescent tails, indicates a tight confinement induced by the sub-$\lambda$ gap. This effect is responsible for an increasing enhancement of the THz electric field for decreasing gap size and increasing wire radius, with respect to the THz wavelength.

A detailed study, based on Finite-Difference Time-Domain (FDTD) simulations and regarding the sub-$\lambda$ TWWG spectral behavior as a function of the geometrical parameters, is presented in Supplement hereinbelow. The main results are reported in FIG. 5E, which shows the spectral response $T_{TWWG}^{sub-\lambda}$ of a TWWG with a 10-µm-gap, calculated as the ratio between the spectra of the THz electric field coupled in the TWWG, $E_{TWWG}(f)$, and the spectra of the THz electric field freely propagating in air $E_{air}(f)$. The simulated spectral response can be very well fitted with a 1/f curve, leading to the conclusion that for a TWWG with 2g<<(R, $\lambda$), it results:

$$T_{TWWG}^{sub-\lambda}(f) = \frac{E_{TWWG}(f)}{E_{air}(f)} \propto \frac{1}{f} \quad (5)$$

As such, it is expected that a sub-$\lambda$ TWWG can perform the time integration of an input THz pulse. However, such a tightly reduced gap size causes a significant worsening of the coupling efficiency of the THz wave inside a straight TWWG, thus making its use of limited application.

In the tapered-TWWG or TTWWG according to the present disclosure as schematically represented FIG. 2, the input gap is much wider than the output gap. Using the theory of the transmission lines applied to the parallel wires configuration with a variable interspacing along the propagation direction z, the capacitance C(z), the inductance L(z) and the characteristic impedance $Z_{TTWWG}(z)$, per unit length, can be analytically determined for high frequencies as follows:

$$C(z) = \frac{\pi \varepsilon}{\cosh^{-1}\left(\frac{d(z)}{R}\right)} \quad (6)$$

$$L(z) = \frac{\mu}{\pi}\cosh^{-1}\left(\frac{d(z)}{R}\right) \quad (7)$$

$$Z_{TTWWG}(z) = \sqrt{\frac{L}{C}} = \frac{\eta}{\pi}\cosh^{-1}\left(\frac{d(z)}{R}\right) \quad (8)$$

d(z)=R+g(z) is the semi distance between the two wire centers (see FIG. 2), $\cosh^{-1}$ the inverse function of the hyperbolic cosine, $\varepsilon$, $\mu$ and $\eta^2=\mu/\varepsilon$ the absolute dielectric permittivity, magnetic permeability, and the vacuum impedance, respectively. Relations (6) and (7) indicate that for gap sizes approaching the complete closure of the wire interspace, i.e. for g→0 (implying d/R→1), the impedance of the TTWWG tends to assume a purely capacitive nature (C→∞, L→0), which is the same type of input impedance featuring time integrator electronic circuits. In addition, Relation (8) can be used to select the tapering angle $\theta \approx \tan^{-1}(g_{in}/L)$ of the waveguide and, in turn, the input gap $2g_{in}$, in order to tune the characteristic impedance seen from the TTWWG input. This allows to achieve a better impedance matching between free-space ($\eta_0 \approx 377\Omega$) and waveguide, thus improving the input coupling efficiency, while maintaining lower losses for relatively long propagation, of the order of centimeters, between about 1 and about 30 cm, compared to a straight, i.e. non tapered sub-$\lambda$ TWWG of constant gap.

TTWWG Characterization
Sub-Wavelength Out-Coupling and Diffraction

A TTWWG was fabricated and tested for the physical demonstration of the integration functionality. The output gap size was fixed at $2g_{in}$=1100 µm in order to ensure that a typical tightly focused THz spot size ($w_{THz} \sim \lambda_{THz}$) is mostly overlapped with the TTWWG input and couple most of the THz power to the fundamental mode $Z_0$ ($g_{in}$=550 µm)≈0.75η. The total length of the TTWWG was l=85 mm, and the tapering angle θ=0.36°. This angle is sufficiently small not to cause abrupt discontinuities inside the waveguide, which may result in undesired distortions of the THz waveform, while also ensuring that the THz power carried by the fundamental mode is not lost in high-order radiating modes. A detailed investigation of the dependence of the TTWWG performance upon both the wire interspacing and the wire radius is presented hereinbelow in Supplement below. For this particular TTWWG, the THz radiation re-emitted from the TTWWG output in the free-space is not entirely collectable via conventional optical components, due to the sub-$\lambda$ TTWWG output end. Indeed, the output gap $g_{out}$ can be regarded as a dipole THz source irradiating the THz wave over an extremely large radiation pattern (see FIG. 2). Since the THz wave vector satisfies the condition $k_{THz} g_{out}=2\pi g_{out}/\lambda_{THz}<1$, Bethe's law of diffraction applies. More in details, in the Bethe's diffraction regime, the confocal parameter $z_B$, defined as the distance at which the beam spot area doubles, is inversely proportional to the second power of the wavelength, as follows:

$$z_B = \frac{k_{THz}^2 g_{out}^3}{2} = \frac{4\pi^2 g_{out}^3}{\lambda_{THz}^2} \quad (9)$$

By inserting all values in Relation (9), a $z_B$=0.76 µm at 1 THz is obtained, which would result in an excessive broadening of the THz beam radius (>10 cm) only after a few millimeters of propagation from the TTWWG output end. Therefore, the THz beam spot would become much larger than the clear aperture of parabolic mirrors typically used in THz-TDS systems, which could only collect a fraction of the emitted THz beam. Besides the power loss due to the partial recovering of the THz radiation, such a strong beam diffraction would hamper the complete gathering of all the frequency components contained in the re-mitted THz spectrum, as modulated by the TTWWG spectral response. This effect would alter the electric field waveform associated to the time-integrated THz pulse coupled out the TTWWG, especially at low frequencies (shorter $z_B$). In light of this observation, THz detection via either electro-optic sampling or photoconductive switches, carried out in the far-field, would lead to an incorrect reconstruction of the THz pulse shape, thus preventing a suitable validation of the TTWWG integration functionality.

TTWWG-Integrated THz Electric Field Detection

In order to overcome such unpractical sub-λ out-coupling, the THz waveform is recorded directly within the TTWWG, using an air-biased coherent detection (ABCD) method. Typically, ABCD uses on the nonlinear interaction between the THz and an optical probe beam, occurring in air, which generates a new beam at roughly the second harmonic (SH) of the probe beam. If the THz-probe interaction region is biased with an external electric field ($E_{bias}$), the nonlinear mixing gives rise to a total SH intensity ($I_{SH}$) comprising a term linearly proportional to the THz electric field. By exploiting a heterodyne scheme, this term can be extracted, leading to:

$$I_{SH} \propto I_{PB}^2 E_{bias} E_{THz}, \qquad (10)$$

where $I_{PB}$ is the probe beam intensity. Relation (10) enables the reconstruction of both amplitude and phase of the THz pulse, by acquiring the SH intensity via an optical detector. This approach is particularly suitable for the reconstruction of THz electric near fields, since the SH intensity resembles the shape of the THz pulse that both temporally and spatially intercepts the probe beam at its focal point. Therefore, the ABCD method is adapted to the case of the TTWWG.

In the detection system illustrated in FIG. 6, the TTWWG is placed at the focal point of a 2-inch 90° off-axis mirror M1. The probe beam PB travels through a hole in the center of the parabolic mirror M1 and then collinearly propagates with the THz beam inside the TTWWG waveguide. Its focal point can be shifted along the z-axis by longitudinally translating lens L1. The emerging second harmonic SH beam, resulting from the THz-probe interaction occurring inside the TTWWG biased at $V_{bias}$, is first separated by the remaining probe power by means of dichroic mirror (DM) and then collected by lens L2. A photomultiplier tube (PMT) acquires the SH intensity. In order to retrieve the input THz pulse waveform, two tip-shaped metal pads replaced the TTWWG to perform conventional ABCD method right at the mirror focal point.

FIG. 6 shows the THz detection path in the detection system. The THz beam focused into the TTWWG by the 2-inch 90° parabolic mirror and the probe beam injected into the TTWWG from its input propagate collinearly in the TTWWG. The copper wires sustaining the propagation of the THz mode also play the role of metal contacts, biasing the air gap at $V_{bias}$. The focal point of the probe beam was moved from position $L_1$ (input) to the TTWWG output gap ($L'_1$), by shifting the corresponding focusing lens position. The out-coming SH beam was gathered by accordingly adjusting the position of lens $L_2$ ($\leftrightarrow L'_2$). Finally, the photomultiplier tube (PMT) acquired the SH beam intensity as a function of the probe-THz time delay, converting it into an electric readout signal, recorded via lock-in detection.

Since Relation (10) shows a quadratic dependence of the total SH intensity ($I_{SH}$) on the probe intensity $I_{PB}$, the contribution to the total SH intensity is expected to only arise from a restricted region around the probe focus. Relation (10) was analytically evaluated for the specific case of the TTWWG geometry and the experimental conditions employed in this study. Specifically, the probe beam intensity ($I_{PB}$) was included, the bias and THz electric fields dependence on the propagation coordinate z. By considering the waveguide parameters indicated in relation to FIG. 2, the analytical expressions for the first two terms in the right-hand side of Relation (10) are determined as follows:

$$I_{PB}(z) = \frac{I_0}{\sqrt{1+\left(\frac{z-z_f}{z_R}\right)^2}}, \qquad (11)$$

$$E_{bias}(z) = \frac{V_{bias}}{\sqrt{d^2(z)-R^2}\cosh^{-1}\left(\frac{d(z)}{R}\right)}. \qquad (12)$$

Figure 7A:
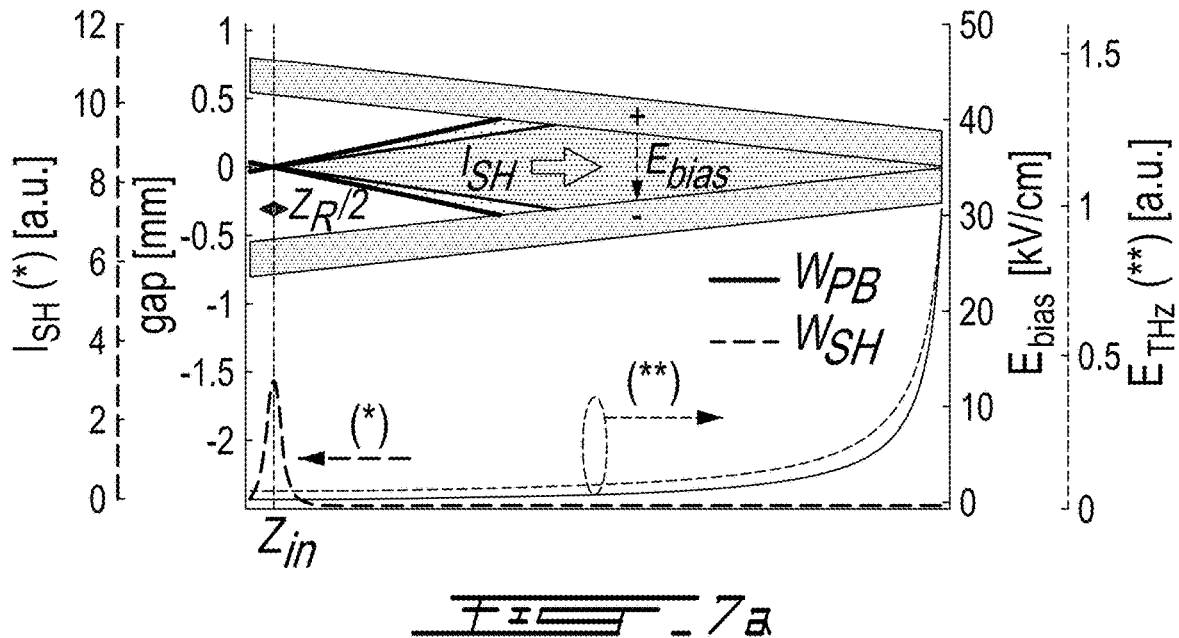
FIG. 7A is a schematical view of the TTWWG-integrated THz detection method giving rise to the ISH signal, for the case of a probe beam focused on the waveguide input ($z_n$=3 mm), THz, probe and SH beams propagating from left to right and polarized along the vertical axis (i.e., the plane containing the two wires), and trends of the bias and THz electric fields along the whole TTWWG.
Figure 7B:
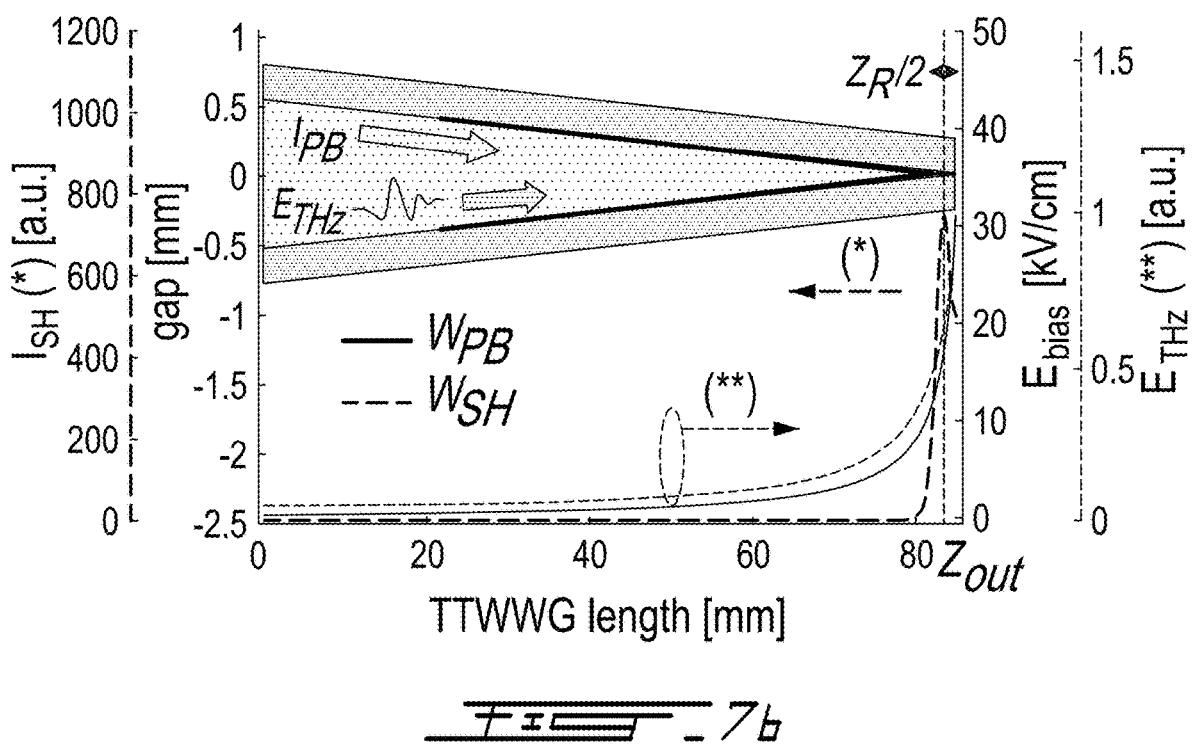
FIG. 7B is a schematical view of the TTWWG-integrated THz detection method giving rise to the ISH signal, for the case of a probe beam focused on the waveguide output ($z_{out}$=83 mm), THz, probe and SH beams propagating from left to right and polarized along the vertical axis (i.e., the plane containing the two wires), and trends of the bias and THz electric fields along the whole TTWWG.

In Relation (11), $z_R = \pi(w_{PB})^2/\lambda_{PB} = 1.6$ mm is the probe Rayleigh length, being $w_{PB} = 20$ μm the waist size and $\lambda_{PB} = 800$ nm the wavelength of the probe beam, while $I_0$ is its peak intensity, exhibited at the focal point $z_f$. From Relation (12), it was determined that a bias electric field $E_{bias} \sim 31$ kV/cm (close to the air dielectric strength) is established between the two wire when the applied voltage is $V_{bias} = 150$ V. Since an analytical expression for the THz electric field along the waveguide is not easily accessible, the data of the FDTD simulations were used in terms of evolution of a THz pulse test propagating inside the TTWWG. In particular, a pulse centered at $f_c = 0.8$ THz, with bandwidth of $B_w = 2$ THz is used. In this context, $B_w$ refers to the full width of the THz spectrum, measured up to the noise floor level (see Supplement below). The case of a Gaussian beam focused to the TTWWG input is also considered, to take into account the in-coupling effect in the calculation. For the purpose of this study, the absolute peak values exhibited by the THz electric field along the z-axis in between the wires were retrieved. The result of the complete calculation is shown in FIG. 7, for the case of a probe beam focused close to either the waveguide input ($z_f = 3$ mm inside the TTWWG) (FIG. 7A) or its output ($z_f = 83$ mm) (FIG. 7B) via a 20-cm-lens, the THz, probe and SH beams propagating from left to right and being polarized along the vertical axis, namely in the plane containing the two wires. For sake of clarity, the trends of the bias and THz electric fields along the whole TTWWG is shown. The contributions to the total TFISH beam are mainly generated in a region as wide as $z_R/2$.

It is noted that, while both the THz and bias electric fields monotonically increase as a function of the TTWWG length, with a steep increase near the output gap, the THz-induced SH intensity is significant only around a fraction of the probe Rayleigh range, being negligible outside this region. This essentially holds for any position of the probe focal point along the z-axis, as highlighted in FIG. 7B, where the probe beam is focused to the TTWWG output, yet with an SH peak amplitude two orders of magnitude higher than that in case FIG. 7A. Thus this method allows for the retrieval of the THz waveform in a region as short as half of the probe Rayleigh length ($\sim z_R/2$). Furthermore, when the probe beam is focused onto the exact quote of the output gap (z=L), the interaction region can be considered as large as $z_R/4$ only, since the THz strength drops immediately outside the waveguide and does not contribute to the SH generation.

Experimental and Simulation Result

Experimental investigations were carried out in two THz spectral regimes, namely broadband and ultra-broadband. In both cases, a 150 fs, 1 kHz, 2 mJ, 800 nm Ti:Sapphire pulsed laser was used, which was split into pump and probe beam arms, by means of a 90/10 beam splitter. While the probe beam was fixed at a power value of 35 mW and focused via a 20-cm-lens into the waveguide for THz field detection as described hereinabove, the pump beam was used to feed either a lithium niobate (LNO) THz source or a two-color plasma THz source, selected because of their different THz spectral emission, under standard air humidity conditions. The LNO source provides a THz pulse train with a ~2.7-THz-wide spectrum (up to the noise floor) and a relatively low central frequency (<1 THz), thus representing the perfect tool to test the time integration functionality of the TTWWG. The ultrashort THz pulses emitted by the plasma source cover spectra as wide as the entire THz range, thus allowing for a complete study of the TTWWG spectral response, including the shortest THz wavelength range ($\lambda_{THz}$<60 μm). As previously mentioned, FDTD simulations were carried out as a support of the experimental investigations, which allowed to predict the TTWWG behavior in terms of the coupled and propagating THz pulse. For each source, the input THz transient was defined so to closely reproduce the experimental conditions. Then, the THz waveform at the TTWWG output ($E_{out}$) was retrieved, whereas the reference input ($E_{in}$) was evaluated via a second set of simulations performed by excluding the waveguide from the calculation domain and by letting the pulse propagate into the free space. In order to confirm the achievement of the time domain integration, the first-order time derivative of $E_{out}$ (i.e., $dE_{out}/dt$) was numerically calculated and compared it with the $E_n$ waveform. The same procedure was applied to the experimental waveforms. Differentiating the output signal, rather than integrating the input pulse, has the advantage of minimizing the effects of numerical artefacts, e.g. the superposition of a spurious offset value. By definition, a nonzero mean value should not be present in electromagnetic transients (i.e. wave packet) propagating in either free-space or guiding structures. Besides, these numerical artefacts may cause artificial alterations of the actual THz pulse shape, thus making difficult the proper analysis of both experimental and simulated waveforms. Finally, in order to quantify the correctness of the time integration, and then the overall TTWWG performance, the root mean squared error (RMSE) between the input and time derivative of the output waveforms was evaluated, for both simulations and experiments. More details about the calculus of the RMSE are given in the Supplement below. In the ideal case, i.e. when two waveforms have the same exact shape, the RMSE parameter is identically equal to zero, while it increases as the agreement between the two curves worsens.

Broadband Regime

Figure 14:
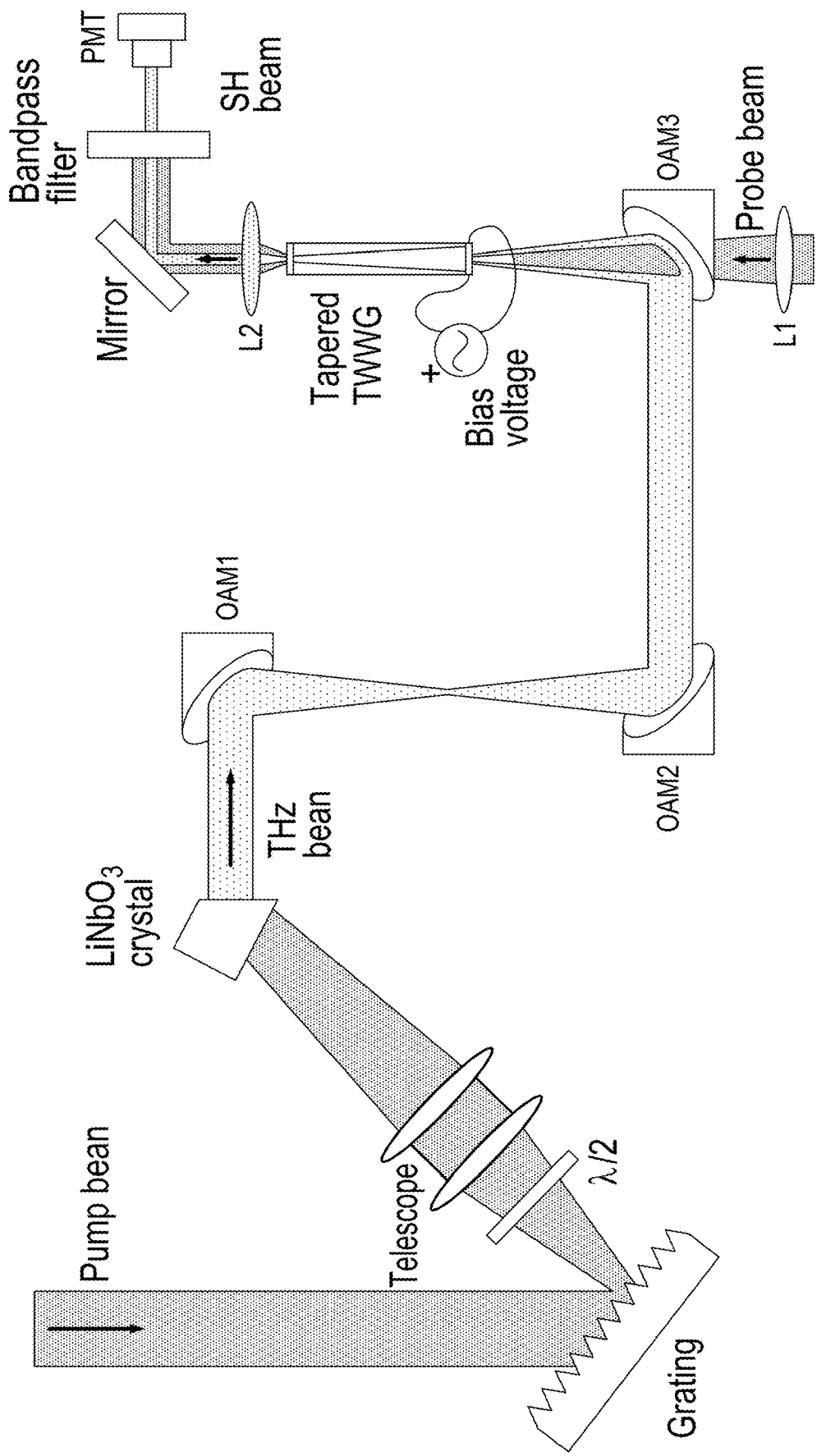
FIG. 14 is a schematical view of a system employed in the broadband regime according to an embodiment of an aspect of the present disclosure.

The system for the generation of THz pulses via optical rectification in a 63°-cut LNO crystal, consisted of a conventional tilt-pulse-front scheme, as shown in FIG. 14 in Supplement below. While the TTWWG waveforms were recorded as previously discussed, the standard ABCD method was carried out in free space for the acquisition of the input waveform. This was so implemented because the TTWWG geometry does not allow to apply bias voltages higher than roughly 150 V, which corresponds to bias electric fields weaker than 0.4 kV/cm at the TTWWG entrance (see Relation (12), still too low to coherently detect a THz waveform right at the input gap. Therefore, the waveguide was replaced with two metallic tips separated by a 1.1-mm-wide air gap (the same value of $2g_{in}$) and biased with a 2-kV-square square wave voltage (at 500 Hz), while the probe beam (with the same power) was focused to the initial position of lens L1. The temporal curves recorded for this source case are displayed in FIG. 8A, whereas their corresponding spectra, evaluated via Fast Fourier Transform (FFT) are presented in FIG. 8B The difference between the $E_{in}$ and $E_{out}$ curves, as underlined by the different temporal evolution of the corresponding electric field cycles, is clearly seen. Moreover, the spectrum of the output waveform shows a considerable enhancement of the low frequency components by almost one order of magnitude, with respect to the input pulse. This is accompanied by a noticeable shift of the peak frequency towards lower values, which explains the longer pulse duration of the $E_{out}$ envelope (FWHM $\Delta t_{out}$~900 fs) compared to that of $E_{in}$ (FWHM $\Delta t_{in}$~590 fs). Finally, the inset in FIG. 8B depicts the ratio between the TTWWG output and air spectra, which represents the experimental spectral transfer function of the TTWWG, as defined in Relation (5). This curve unveils a good match with the ideal 1/f tend curve. In order to further confirm the correctness of the pulse time integration, the numerically evaluated time derivative of $E_{out}$ is shown in the same plot. The very good agreement between the $dE_{out}/dt$ curve and that of the input $E_{in}$ in the time domain is validated by an $RMSE_{exp}$ as low as 2.4% Finally, FIG. 8B indicates that the time integration was achieved over a THz spectral window larger than 2 THz. Numerical results shown in FIG. 8C and FIG. 8D, additionally support the present findings, as the simulated curves reproduce well the experimental transients, as well as reveal a good matching between $E_{in}$ and $dE_{out}/dt$ in both the time and spectral domains. For the temporal waveforms, the calculated $RMSE_{sim}$ is 1.64%, fairly close to that of the experiments. Both temporal and spectral curves are normalized with respect to their own maxima.

Ultra-Broadband Regime

Figure 15:
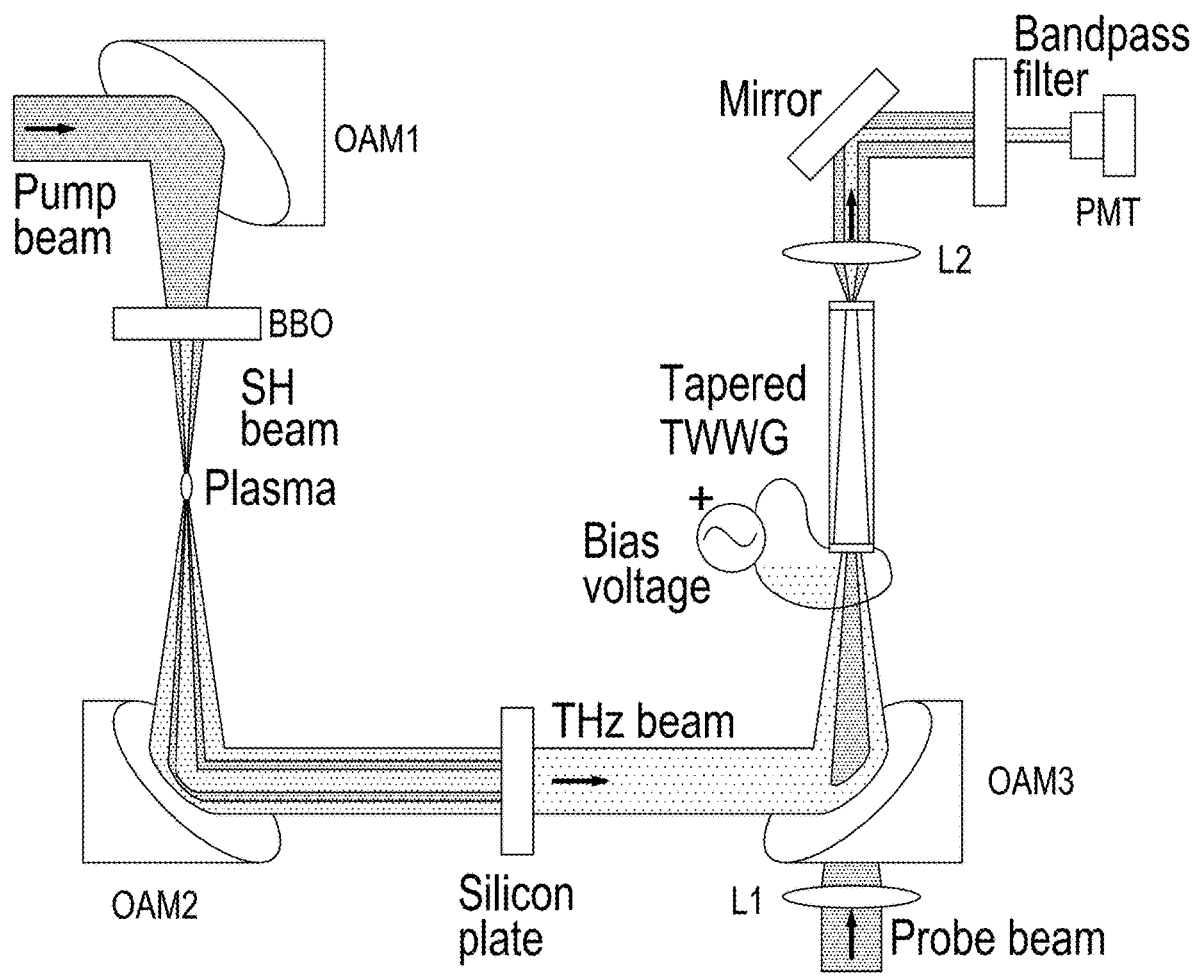
FIG. 15 is a schematical view of a system employed in the ultra-broadband regime according to an embodiment of an aspect of the present disclosure, the detection system being the same as in FIG. 14.

The two-color THz plasma source was implemented by focusing together the pump beam with its second harmonic, achieved through a 100-μm-thick BBO crystal placed in the focusing path of a 4" parabolic mirror (see FIG. 15). As for the previous case, FIG. 9A depicts the experimental temporal waveforms recorded in air (input signal, $E_{in}$) and at the TTWWG output ($E_{out}$), whereas FIG. 9B shows their corresponding spectra. It is noted that the spectral emission of the plasma source extends to almost 10 THz in air, while the pulse detected in the TTWWG exhibits a bandwidth as large as ~9 THz only. This shrinkage of the detected bandwidth should be attributed to diverse effects. First, since the same focusing geometry was kept at the detection system, the higher peak frequency (~2 THz) featuring the 10-THz-wide pulses, resulted in a smaller focal spot ($1/e^2$-intensity diameter of ~150 μm) at the input of the TTWWG, compared to that of the LNO source (~1 mm). Moreover, wavelengths as short as few tens of micrometers are barely guided through the relatively large gap size of the initial section of the TTWWG (~1 mm). Finally, THz beams generated by a plasma filament generally exhibit a donut-shaped beam profile in the far field, which, differently from a Gaussian profile, is subsequently focused down to a cross-like shape.

Eventually, all these effects penalize the high frequency components, which rather radiate outside the waveguide. These observations explain the overall frequency loss observed in the higher part of the output THz spectrum (>7 THz (FIG. 9B). It is also noted that the TTWWG spectrum is strongly enhanced in the low frequency range, as stated by the ~1-THz-red shift experienced by the peak frequency, compared to the air case. In the time domain, this corresponds to a FWHM pulse duration that lengthens from $\Delta t_{in}$=270 fs to $\Delta t_{out}$=420 fs. The parameters of the investigated TTWWG were not optimized for the correct integration of such ultra-broadband THz pulses, since in the highest part of the spectrum $g_{out}$ can no longer be considered perfectly sub-$\lambda$. Yet, the numerical first-order time derivative of the output waveform, $dE_{out}/dt$, shows a fairly good agreement with the input transient. The small inconsistency observed at relatively low frequencies (<1 THz) may be ascribed to the detrimental effect of the aforementioned unconventional THz focused spot at the TTWWG input. The $RMSE_{exp}$ is around 12%. This value might appear particularly higher than the LNO case, yet it should be ascribed to fact that this type of THz pulse is very short, featuring a main lobe duration shorter than 200 fs (see the solid black curve in FIG. 9A). As such, the recorded THz transient consists of a very small number of data points, taken with a relatively large time step of 15 fs, limited by the probe pulse duration (150 fs), which induces an overestimation of the corresponding $RMSE_{exp}$. The inset in FIG. 9B shows that the TTWWG transfer function follows quite closely the ideal 1/f curve over a large THz spectral window, yet with a trend inversion below 1 THz, due to the discussed issues affecting those frequency components. Simulation results, computed by accounting for the smaller THz beam spot at the TTWWG input gap, reproduce the experimental trends with a good agreement, as shown in FIGS. 9C and 9D. In particular, the spectrum of the TTWWG pulse shows an enhancement of the low frequency components, and a corresponding red shift of the peak frequency, compared to the air case. Finally, the $RMSE_{sim}$ is around 10%, approaching that of the experimental case. Number of temporal points used in the simulation case is much higher than that of the experiment, which allows for a more precise evaluation of the corresponding RSME. A more correct time integration of such an ultra-broadband THz signal may be achieved in the first place by reducing the output gape size, $g_{out}$, and adjusting the input aperture of the TTWWG.

The present disclosure teaches a method that uses a tapered two-wire waveguide to obtain a non-resonant frequency response that enhances the low frequency components of the input THz pulse. The present disclosure teaches a signal-processing method and a system for carrying out first-order time-domain integration of broadband terahertz (THz) pulses, in a range between 0.1 and 10 THz.

Time-domain integration of broadband THz pulses was achieved using the frequency response of a tapered two-wire waveguide, comprising a wire gap that shrinks down to a sub-wavelength size from the input to the output end. The achieved tight confinement of the THz radiation induced by the reduced output gap size results in an enhancement of the propagating electric field, inversely proportional to the THz frequency, in a typical spectral transfer function of a conventional time integrator. The time integration functionality has been proved by comparing the THz waveforms acquired in air (i.e. the integrand pulse) and right at the TTWWG output gap (i.e. the time-integrated pulse). In particular, the TTWWG waveforms have been acquired by carrying out a near-field detection method based on the ABCD method, in order to minimize alterations of the shape of the time-integrated THz transients, potentially induced by far-field detection methods. However, the detection method only represents a straightforward and convenient approach to demonstrate the operation of the TTWWG, since it is not strictly connected to the time-domain integration functionality. The collection of all the frequency components emitted by the sub-$\lambda$ TTWWG may also be achieved by positioning the output gap at the focal point of a parabolic reflector, with the shape of a paraboloid of revolution, and provided with a hole at its vertex.

The present integrator for broadband THz pulses may be used for the construction of a wide range of complex analog systems for signal-processing and computing applications based on THz waves, such as real-time computation of differential systems and digital counter circuits. For example, the present integrator may be employed for the implementation of emphasis/de-emphasis communication protocols, similar to those used in conventional RF systems, providing a pre-conditioning of the THz pulses before being delivered in free space and detected in a THz receiver, where the time integration (is used to restore the original information signal. Thus, the higher frequencies are first enhanced to counteract the atmospheric absorption loss, which may be particularly strong in the THz range, and subsequently attenuated by the integration action so to equalize the signal to its original shape. This may enable an increase in the propagation distances of long-haul communication links using THz radiation systems.

Supplementary

A detailed parametric study aimed at establishing how the maximum operating bandwidth of the tapered two-wire waveguide is related to the gap size in a tapered two-wire waveguide (TTWWG) is presented. Investigations are performed via FDTD simulations, which consist in the direct calculations of the THz electric field waveform as it propagates through the TTWWG. Statistical error parameters are defined in order to quantify the correctness of the time-domain integration functionality.

Figure 10A:
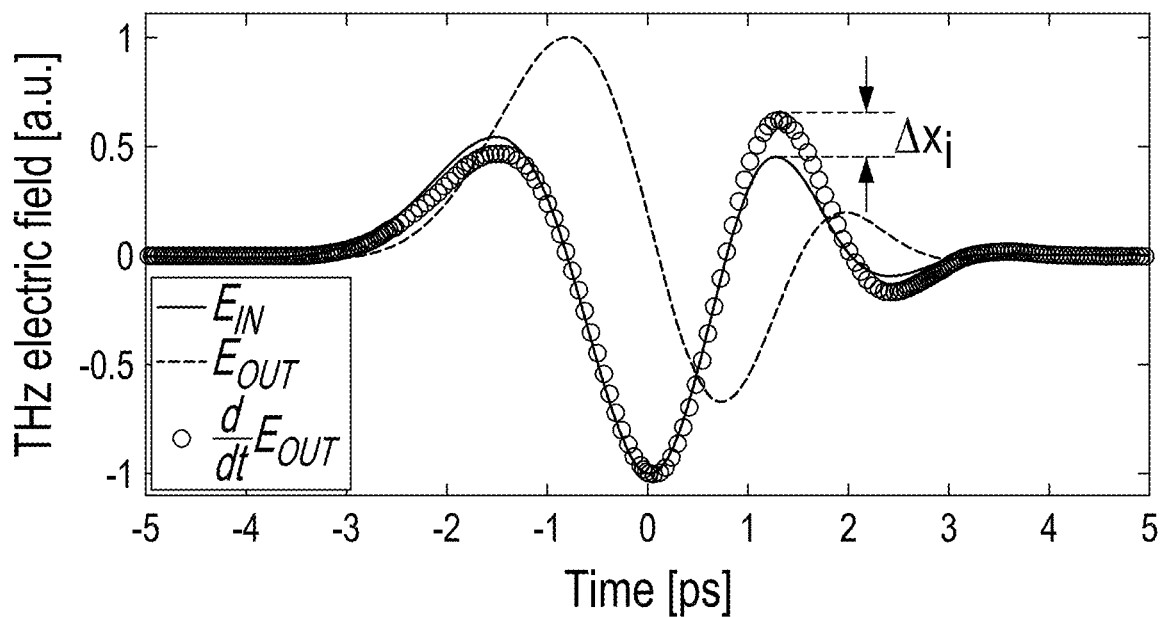
FIG. 10A shows the temporal waveforms recorded after propagation in air (solid line) and at the TTWWG output (stippled line) and the numerically-evaluated first order time derivative of the TTWWG output waveform (circles) as a comparison with the air waveform, the overlap between the last two waveforms is quantified in terms of the amplitude difference indicated by the i-th contribution ($\Delta x_i$); waveforms are normalized to their own maxima.
Figure 10B:
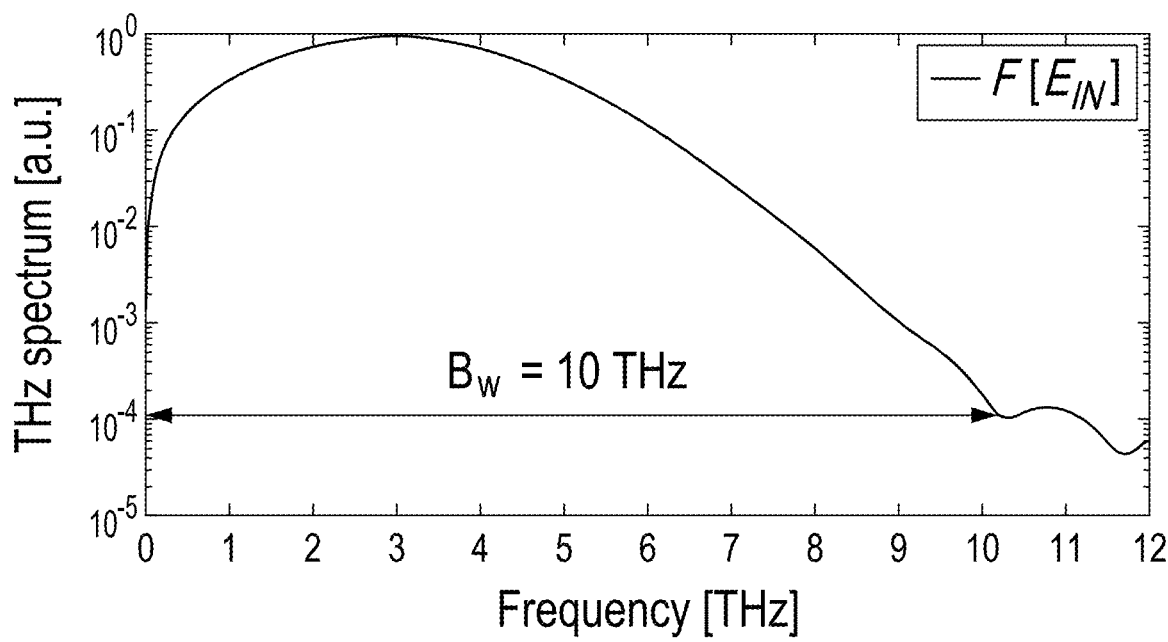
FIG. 10B shows the spectrum of the THz pulse recorded in air.
Figure 11:
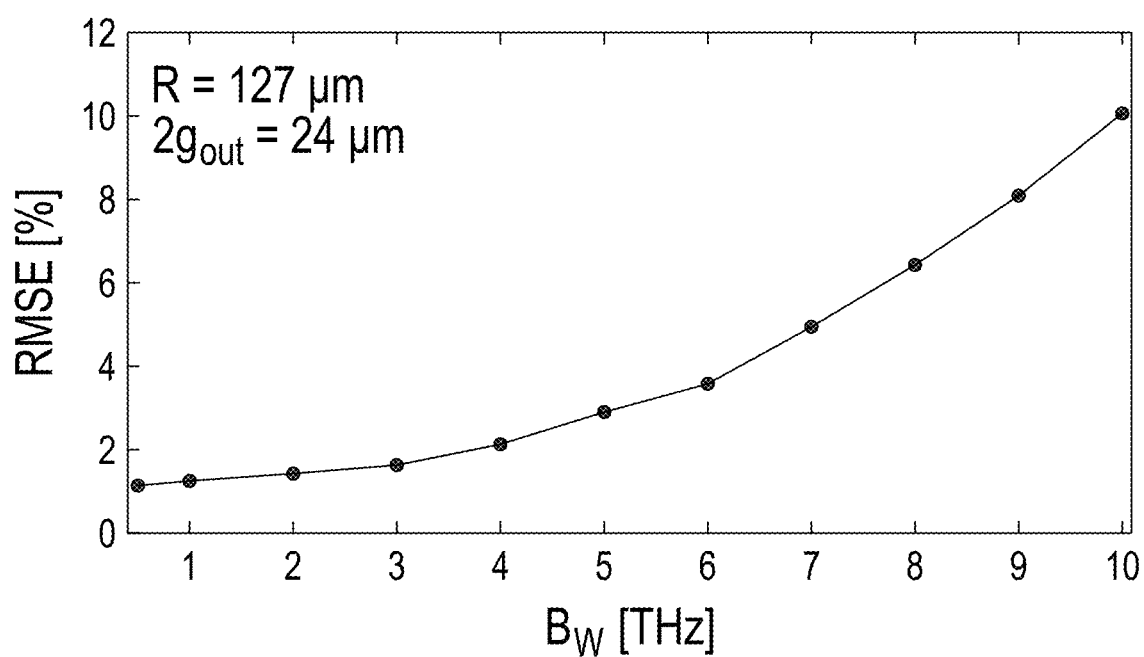
FIG. 11 shows the evaluated root mean squared errors (RMSE) as a function of the input THz pulse bandwidth BW, with the wire gap (2gout) and the wire radius (R) fixed at 24 and 127 μm, respectively, and the input gap (2gin) fixed at 1.1 mm.

Study of the TTWWG response as a function of the THz pulse bandwidth: as mentioned hereinabove, the field enhancement occurring at the TTWWG output mainly shows a 1/f dependence on the frequency, only if two conditions are satisfied at the same time (see Relation (5)). Specifically, in order to achieve the first-order time integration of a THz pulse, the shortest wavelength in its spectral content must be larger than the TTWWG output gap. Consequently, as the THz bandwidth of the coupled THz pulse gets larger, the associated waveform reaching the output of the TTWWG may deviate from the correct time integral of the input THz signal. In order to investigate the maximum operational bandwidth of the input THz pulse for which the TTWWG still shows a good performance, a simulation study as a function of its geometrical parameters was carried out. All the simulations were carried out by using an FDTD approach, where a THz pulse test is being propagated through either the TTWWG or free space. In particular, the values of the wire gap ($2g_{out}$) at the TTWWG output was fixed and radius (R) are fixed at 24 and 127 µm, respectively, while the gap at the TTWWG input is always fixed at $2g_{in}$=1.1 mm. For this study, the bandwidth $B_W$ of the input THz pulse was varied in the range of values between 0.5 and 10 THz. The fact that $B_W$ is not the continuum spectral range of the THz pulse, rather it is a number indicating its width (up to the noise floor) and in the present studies assumed integer values. For each $B_W$ value, the THz pulse duration varies accordingly. The first step is the simulation of the propagation of the THz pulse with the chosen bandwidth in air. The temporal waveform at the focal point of a virtual focusing component was retrieved. Subsequently, the temporal waveform was retrieved at the TTWWG output. The first-order time derivative of the waveform retrieved at the TTWWG output were numerically evaluated and compared it with that calculated in air (free space), which acts as the integrand waveform. Therefore, the degree of agreement between the first derivative of the TTWWG waveform and that in air is a measure of the TTWWG performance. In order to quantify the correctness of the integration functionality, the root mean squared error (RMSE) between the two curves was calculated. More in details, such a parameter is evaluated as the square root of the mean squared discrepancy between the observed and expected values, and it is defined as follows:

$$RMSE(x, \hat{x}) = \sqrt{\frac{1}{n}\sum_{i=1}^{n}(x_i - \hat{x}_i)^2}, \qquad (S1)$$

n is the number of samples, $x_i$ and $\hat{x}_i$ the observed values and the expected values, respectively. Thus, the RMSE parameter expresses the overall deviation of the measured data from the ideal case. It always assumed non-negative values and it is often reported as percentage values. In the present case, it was considered the numerically evaluated derivative of the waveform recorded at the TTWWG output as the expected values, and the waveform recorded after the propagation in air as the observed values. Therefore, the lower the RMSE value, the lower the discrepancy between these two curves. Ideally, when the two waveforms can be perfectly overlapped, the RMSE value is identically equal to 0%. FIG. 10A shows the retrieved temporal waveforms for the case of a $B_W$=10 THz (as highlighted in FIG. 10B), where it is also indicated how each contribution to the total RMSE is evaluated. The two waveforms indicated by the solid line and circles are not perfectly overlapped, as also pointed out by the different amplitude value of each lobe. The difference between two homologous points is indicated with $\Delta x_i$. For this case, the overall value of the RMSE is ~10%. By repeating the same calculations for each value of THz pulse bandwidth between 0.5 and 10 THz, the trend of the RMSE as a function of $B_w$ is depicted in FIG. 11. It results that the RMSE monotonically increases as the spectral bandwidth enlarges. This is due to the fact that as $B_w$ increases, the shortest wavelength in the pulse spectral content decreases until the output gap does no longer satisfy the sub-wavelength condition ($2g_{out} \ll \lambda_{THz}$). Indeed, in the case illustrated above, the wavelength corresponding to 10 THz is 30 μm, which is comparable to the fixed output gap $2g_{out}$ value of 24 μm. For bandwidth narrower than 0.5 THz, corresponding to central frequencies falling in the millimeter range, the coupling of the THz beam at the TTWWG input becomes extremely weak, due to the sub-wavelength size the wires radius. As a consequence, the wires are essentially bypassed by the THz radiation because of diffraction. This effect would lead to a rapid worsening of the RMSE. However, such a long wavelength range (>3 mm) falls in the microwave domain and lies outside the present investigation region.

Study of the TTWWG Response as a Function of the Wire Gap.

Figure 12A:
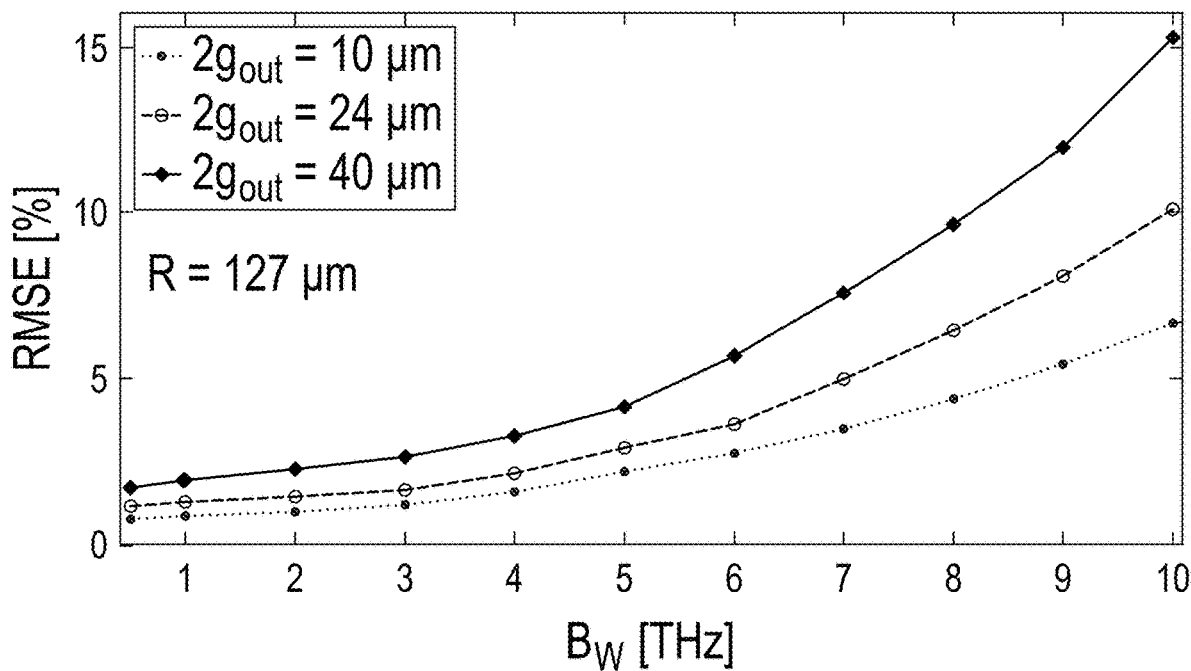
FIG. 12A shows RMSE trend as a function of BW, evaluated for three different output gap values: 10 μm (dotted line), 24 μm (stippled line) and 40 μm (solid line), for a wire radius was fixed at R=127 μm.
Figure 12B:
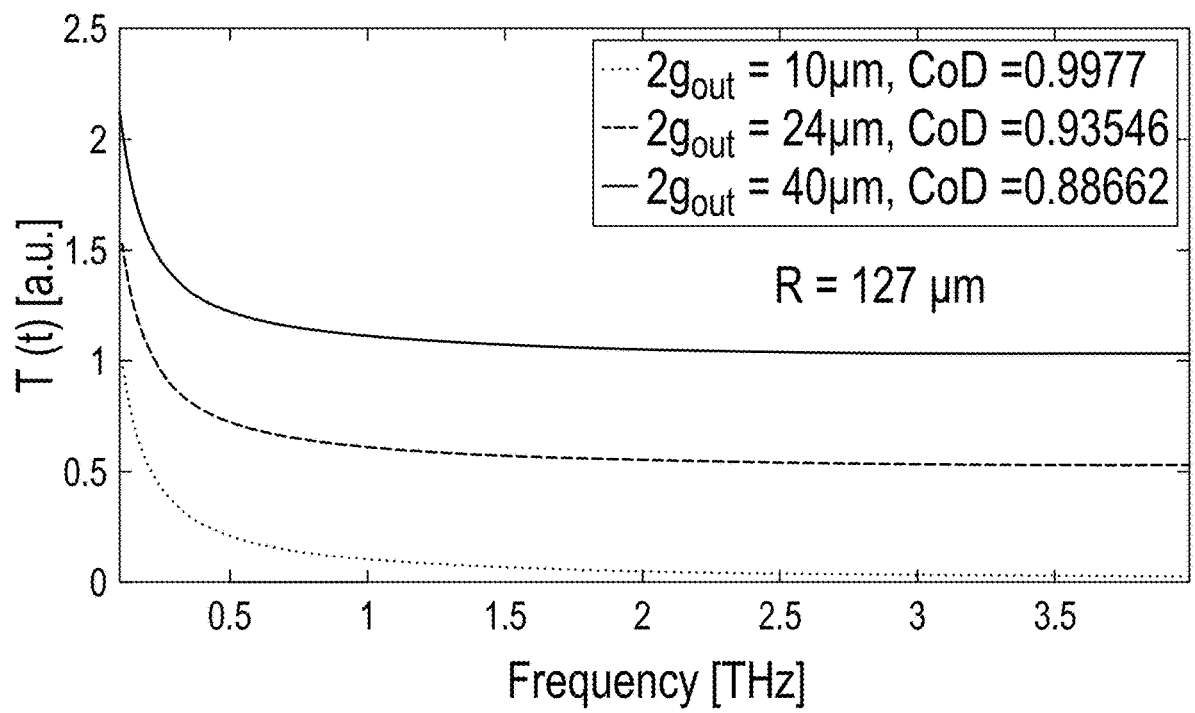
FIG. 12B shows a comparison among the evaluated simulated transfer functions (open circles) and the 1/f fitting curves (solid lines) for TTWWGs as in FIG. 12A and BW=4 THz; curves being shifted along the y-axis for clarity.

In order to investigate the effect of the gap size on the TTWWG performance, the same study as detailed hereinabove was repeated, for two other gap values $2g_{out}$, i.e. 10 and 40 μm, while the wire radius is kept fixed at R=127 μm. The results are shown in (FIG. 12), As shown in FIG. 12A, the RMSE trends among three different TTWWGs, featuring a $2g_{out}$ of 10, 24 and 40 μm were compare. As expected, while all the RMSE curves show a similar trend, it is noted that the TTWWG with a 10-μm-gap shows a significantly better performance, since the corresponding RMSE is the lowest for all the investigated values of $B_w$. This is because the sub-wavelength condition on the gap size is much better fulfilled for the 10-μm-case all over the THz spectrum. It is worth noticing a faster increase of the RMSE values in the case of $2g_{out}$=40 μm, for $B_w$ larger than 5 THz, with respect to the other two trends. Most likely, this has to be ascribed to the fact that for a relatively large gap size, the confinement of such particularly broadband THz radiation is less effective, causing more radiative losses that further alter the output THz pulse shape. The influence of the gap size on the TTWWG spectral response was further investigated by evaluating its transfer function. To this aim, the spectra associated to the TTWWG and air THz pulses via Fast-Fourier Transformation (FFT) were calculated and their ratio taken, as follows:

$$T(f) = \frac{\mathcal{F}(E_{TTWWG})}{\mathcal{F}(E_{air})} \qquad (S2)$$

where the operator F(.) stands for the FFT algorithm. The results achieved for a THz pulse with a fixed $B_w$=4 THz are shown in FIG. 12B, which depicts in open circles the trends of T(f) for three values of the gap size (10, 24 and 40 μm), whereas the solid lines represent the best hyperbolic fit curves (~1/f). Such a frequency dependence indicates that the TTWWG performs the ideal time-domain integration. For this case, in order to quantify how much good is the approximation of ideal time integrator, the so-called coefficient of determination (CoD) was used. The coefficient of determination (CoD) is a statistical parameter that assumes values in the range between zero and one: the higher the value, the better the quality of the fit in FIG. 12B. As can be seen, the overlap between the simulated and ideal transfer functions indeed worsens as the wire gap gets larger. Yet, the CoD maintains around 0.89 for $2g_{out}$=40 μm, while it is as high as a ~0.95 for the 24-μm-gap case.

Study of the TTWWG Response as a Function of the Wire Radius.

Figure 13A:
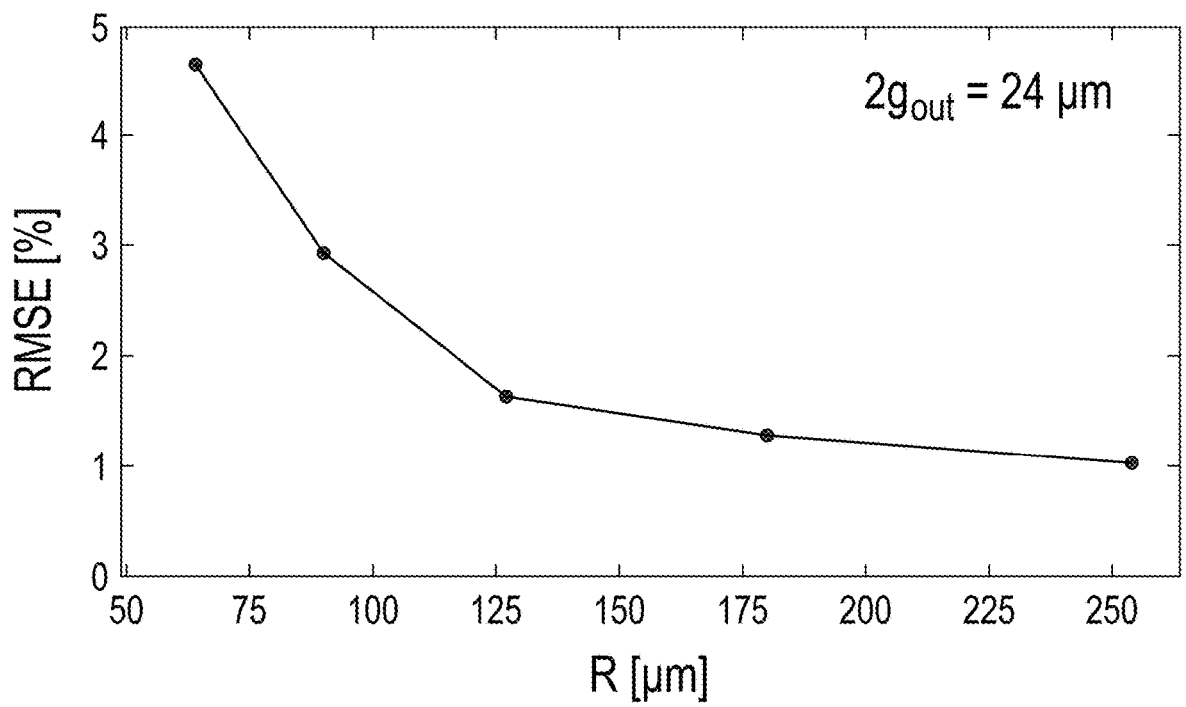
FIG. 13A shows the RMSE trend as a function of the wire radius R, for a 2gout=24 μm and assuming an input THz pulse with BW=4 THz.
Figure 13B:
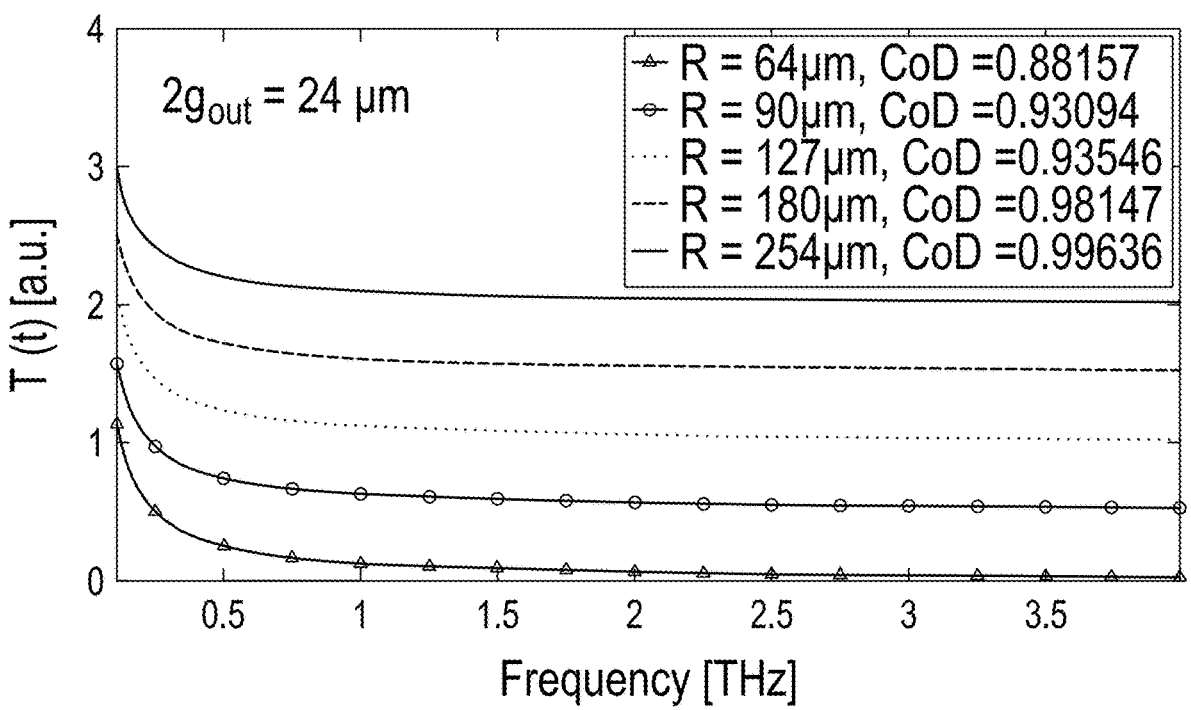
FIG. 13B shows a comparison among the evaluated simulated transfer functions (open circles) and the 1/f fitting curves (solid lines), for the same wire radius values and THz pulse bandwidth as in FIG. 13A, the solid lines representing the best 1/f fitting curves, curves being shifted along the y-axis for clarity.

As detailed hereinabove, another parameter affecting the performance of the TTWWG is the wire radius R. On the one hand, the field enhancement (FE) at the TTWWG output is inversely proportional to the wire radius R, since the THz pulse is squeezed in an ever-smaller volume. On the other hand, the FE is expected to show a 1/f dependence upon the frequency only when the wire radius is much larger than the output gap (R>>$2g_{out}$). Consequently, a theoretical study about the spectral response of the TTWWG as a function of the wire radius R was done, while keeping the gap between the wires fixed at $2g_{out}$=24 μm. To this aim, four values of the radius that approach those of commercially available products, i.e. 64, 90, 127, 180 and 254 μm, were selected. The input THz bandwidth was fixed at $B_w$=4 THz. The results are shown FIG. 13. In particular, in FIG. 13A, the RMSE values calculated for the air waveform and the numerically-evaluated first derivative of TTWWG output, as a function of the previously mentioned R values, were compared. As can be seen, the RMSE diminishes as the wire radius increases, thus revealing an improvement of the TTWWG time integration functionality. This confirms that the TTWWG output waveform tends to resemble the shape of the ideal integral function, as the radius becomes larger than the wire gap. In addition, FIG. 13B shows the comparison among the transfer functions of the TTWWG featuring different wire radii, calculated from the simulations, along with the best hyperbolic fit curves. As expected, the coefficient of determination (CoD) of the fit decreases for narrowing wires, approaching 0.89 for the R=64 µm.

in the broadband regime, as illustrated in FIG. 15A, THz pulses are generated by optical rectification in a $LiNbO_3$ crystal. The wavefront of the optical pump beam is tilted by means of a customized grating with 1800 grooves/mm. The generated THz beam is first magnified by a factor of 10 and then focused to the TTWWG input via a 2-inch 90° parabolic mirror. The probe beam is focused in the TTWWG via a 20-cm lens (L1) to carry out the THz electric field detection. A voltage generator, provides the required square wave voltage, which is directly applied to the copper wires of the TTWWG so to bias the THz and probe beam nonlinear interaction. The total second harmonic beam emerges from the TTWWG output and is collected (L2) and filtered from the remaining probe beam, before acquisition via a photomultiplier tube (PMT).

In the ultra-broadband regime, as illustrated in FIG. 15A, THz pulses are generated via a two-color plasma source, achieved by mixing the pump beam and its second harmonic (obtained from a BBO crystal) in the air plasma channel. A high-resistivity 0.5 mm-thick silicon wafer is used to separate the THz radiation from the remaining optical beams. The THz beam is then focused within the TTWWG through a 2-inch 90° off-axis mirror. The detection system is the same of that presented in FIG. 15A.

The spectral response of a tapered-two-wire waveguide (TTWWG) for THz radiation is used. The geometrical parameters of the tapered-two-wire waveguide can be selected in order to tune the operating bandwidth of the waveguide. In particular, the waveguide operating bandwidth can be controlled by accurately adjusting both input ($g_{in} \sim w_{THz}$) and output ($g_{out} < \lambda_{THz}$) gap sizes, thus covering the entire THz region, from 0.1 to 10 THz.

The tapering angle of the waveguide could be made variable via an electrically-driven control which acts on both wires, so to tune the spectral response of the waveguide in real-time configuration.

The present tapered two-wire waveguide (TTWWG) is a standalone THz time integrator device, which can be physically installed in currently available THz systems, allowing for the implementation of basic signal-processing operations in an analogical fashion, thus moving this task from software to the hardware level. Indeed, the THz pulse to be time-integrated does no longer require being recorded and digitally manipulated, which would cause the loss of the freely propagating THz pulse itself. Conversely, the present system allows for the manipulation of THz signals directly in the same THz frequency domain, thus making the resulting time-integrated THz pulse available in THz-based applications. For example, the THz time integrator can be used for long-haul communications links at THz frequencies, by leveraging the enhancement of the low frequency components of the time-integrated THz pulses, which are less susceptible to atmospheric absorption and turbulence, thus boosting the communication performance.

The scope of the claims should not be limited by the embodiments set forth in the examples, but should be given the broadest interpretation consistent with the description as a whole.

The invention claimed is:

1. A waveguide for time-domain integration of THz pulses, comprising two wires extending from an input gap $g_{in}$ to an output gap $g_{out}$ at a tapering angle θ relative to a longitudinal axis, a gap of the waveguide decreasing linearly from the input gap $g_{in}$ to the output gap $g_{out}$, wherein a size of the output gap is at least one order of magnitude smaller than a central wavelength $\lambda_{THz}$ in a spectrum of the THz pulses.

2. The waveguide of claim 1, wherein an input THz pulses have a frequency in a range between 0.1 and 10 THz.

3. The waveguide of claim 1, wherein an input THz pulse central wavelength $\lambda_{THz}$ is comprised in a range between 0.03 and 3 mm.

4. The waveguide of claim 1, wherein the tapering angle is selected in a range between 0° and a maximum tapering angle θmax selected depending on an input THz pulse central wavelength $\lambda_{THz}$.

5. The waveguide of claim 1, wherein the tapering angle is selected in a range between 0° and a maximum tapering angle θmax selected depending on an input THz pulse central wavelength $\lambda_{THz}$ as follows: $\theta\_max=\tan^{-1}[(1/2*(G_{THz}))/\lambda_{THz}]$, $G_{THz}$ being a maximum gap variation dependent on the THz pulse spectrum.

6. The waveguide of claim 1, wherein a size of the output gap is selected in a range between 10 and 30 micrometers and a size of the input gap is selected in a range between 0.1 and 3 millimeters, for a maximum gap variation $G_{THz}$ of $\lambda_{THz}/10$ dependent on the THz pulse spectrum.

7. The waveguide of claim 1, wherein the wires are metallic wires of a radius at least equal to an input THz pulse central wavelength $\lambda_{THz}$.

8. The waveguide of claim 1, wherein the wires are made in one of: copper, gold and aluminum.

9. The waveguide of claim 1, wherein the wires are supported in tension using polymer holders.

10. A method for time-domain integration of THz pulses, comprising confining input THz pulses in a waveguide comprising two wires separated by a gap linearly decreasing between an input gap and an output gap, wherein a size of the output gap is at most one order of magnitude smaller than a central wavelength $\lambda_{THz}$ in a spectrum of the input THz pulses.

11. The method of claim 10, wherein the input THz pulses have a central frequency in a range between 0.1 and 10 THz.

12. The method of claim 10, wherein an input THz pulses central wavelength $\lambda_{THz}$ is comprised in a range between 0.03 and 3 mm.

13. The method of claim 10, wherein the wires extend from the input gap to the output gap at a tapering angle θ relative to a longitudinal axis, the tapering angle being selected in a range between 0° and a maximum tapering angle θmax, the maximum tapering angle θmax being selected depending on an input THz pulses central wavelength $\lambda_{THz}$.

14. The method of claim 10, wherein the wires extend from the input gap to the output gap at a tapering angle θ relative to a longitudinal axis, the tapering angle being selected in a range between 0° and a maximum tapering angle θmax selected depending on an input THz pulses central wavelength $\lambda_{THz}$ as follows: $\theta\_max=\tan^{-1}[(1/2*(G_{THz}))/\lambda_{THz}]$, $G_{THz}$ being a maximum gap variation dependent on the THz pulse spectrum.

15. The method of claim 10, wherein the wires have a radius at least equal to an input THz pulses central wavelength $\lambda_{THz}$.

16. The method of claim 10, wherein the wires are supported in tension using polymer holders.

17. A system for time-domain integration of THz pulses, comprising a waveguide made of two wires separated by a gap linearly decreasing between an input gap and an output gap, wherein a size of the output gap is at most one order of magnitude smaller than a central wavelength $\lambda_{THz}$ in a spectrum of the THz pulses.

18. The system of claim 17, wherein the wires have a radius at least equal to an input THz pulses central wavelength $\lambda_{THz}$.

19. The system of claim 17, wherein an input THz pulses have a frequency in a range between 0.1 and 10 THz.

20. The system of claim 17, wherein the tapering angle is selected in a range between 0° and a maximum tapering angle θmax selected depending on an input THz pulses central wavelength $\lambda_{THz}$.

* * * * *